United States Patent
Karimine et al.

(10) Patent No.: US 10,526,674 B2
(45) Date of Patent: Jan. 7, 2020

(54) STRESS-RELIEF HEAT TREATMENT APPARATUS

(71) Applicant: NIPPON STEEL & SUMITOMO METAL CORPORATION, Chiyoda-ku, Tokyo (JP)

(72) Inventors: Kenichi Karimine, Tokyo (JP); Masaharu Ueda, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 37 days.

(21) Appl. No.: 15/834,788

(22) Filed: Dec. 7, 2017

(65) Prior Publication Data

US 2018/0094333 A1 Apr. 5, 2018

Related U.S. Application Data

(63) Continuation of application No. 14/421,707, filed as application No. PCT/JP2013/079712 on Nov. 1, 2013, now abandoned.

(30) Foreign Application Priority Data

Nov. 16, 2012 (JP) ................................ 2012-252111
Nov. 16, 2012 (JP) ................................ 2012-252113

(51) Int. Cl.
*C21D 9/04* (2006.01)
*B23K 31/00* (2006.01)
(Continued)

(52) U.S. Cl.
CPC .............. *C21D 9/04* (2013.01); *B23K 9/0026* (2013.01); *B23K 23/00* (2013.01); *B23K 31/00* (2013.01);
(Continued)

(58) Field of Classification Search
CPC ..... C21D 9/04; C21D 9/50; C21D 1/42; C21D 1/30
See application file for complete search history.

(56) References Cited

U.S. PATENT DOCUMENTS 2,184,534 A * 12/1939 Smith .................... B23K 9/035
219/137 PS
4,458,125 A 7/1984 Leis
(Continued)

FOREIGN PATENT DOCUMENTS

JP B30-003804 6/1955
JP 59-41425 A 3/1984
(Continued)

OTHER PUBLICATIONS

International Search Report dated Jan. 21, 2014 issued in corresponding PCT Application No. PCT/JP2013/079712 (with English Translation).
(Continued)

*Primary Examiner* — Scott R Kastler
(74) *Attorney, Agent, or Firm* — Birch, Stewart, Kolasch & Birch, LLP

(57) ABSTRACT

A stress-relief heat treatment method for stress-relief heat-treating a rail which is welded includes arranging at least one pair of an induction heating coil to face the rail at both sides of a welding center along the longitudinal direction of the rail while being separated from the welding center of the rail by 20 mm to 300 mm in a longitudinal direction of the rail and being an axial direction of the induction heating coil parallel to the longitudinal direction of the rail. The method further includes flowing a current to the induction heating coil arranged at one side of the welding center and to the induction heating coil arranged at the other side of the welding center being opposite to each other, and induction
(Continued)

heating the rail to a heating temperature of 400° C. or higher and 750° C. or lower.

4 Claims, 11 Drawing Sheets

(51) Int. Cl.
  *C21D 9/50* (2006.01)
  *C21D 1/30* (2006.01)
  *C21D 1/42* (2006.01)
  *B23K 9/00* (2006.01)
  *B23K 23/00* (2006.01)
  *B23K 31/02* (2006.01)
  *B23K 101/26* (2006.01)

(52) U.S. Cl.
  CPC .............. *B23K 31/022* (2013.01); *C21D 1/30* (2013.01); *C21D 1/42* (2013.01); *C21D 9/50* (2013.01); *B23K 2101/26* (2018.08); *Y02P 10/253* (2015.11)

(56) References Cited

U.S. PATENT DOCUMENTS 5,714,020 A 2/1998 Perrin

2015/0211087 A1* 7/2015 Karimine ............... B23K 31/00
   266/249

FOREIGN PATENT DOCUMENTS

| JP | 59-93837 A | 5/1984 |
| JP | 59-93838 A | 5/1984 |
| JP | 61-67719 A | 4/1986 |
| JP | 8-337819 A | 12/1996 |
| JP | 2007-175707 A | 7/2007 |
| RU | 373319 A1 | 3/1973 |
| RU | 1016373 A | 5/1983 |
| RU | 1085724 A | 4/1984 |
| RU | 2200764 C2 | 3/2003 |
| WO | WO-2008107660 A1 * | 9/2008 ............ C21D 1/42 |
| WO | WO 2012/161207 A1 | 11/2012 |

OTHER PUBLICATIONS

Russian Office Action and Search Report, dated Aug. 3, 2016, for Russian Application No. 2015107735, together with an English translation thereof.

\* cited by examiner

FIG. 8

| NUMBER OF ARRANGEMENT LOCATIONS PER ONE SIDE | SYMBOL: ◆ SPOT HEATING AT ONE SIDE (ONLY ONE SIDE IS HEATED) | SYMBOL: ◇ SPOT HEATING AT ONE SIDE (BOTH SIDES ARE HEATED UNSIMULTANEOUSLY) | SYMBOL: ▲ SPOT HEATING AT BOTH SIDES (BOTH SIDES ARE HEATED SIMULTANEOUSLY) |
|---|---|---|---|
| ONE | | | |
| TWO | | | |
| THREE | | | |

| NUMBER OF ARRANGEMENT LOCATIONS PER ONE SIDE | SYMBOL: ■ WHOLE CIRCUMFERENCE HEATING AT ONE SIDE (ONLY ONE SIDE IS HEATED) | SYMBOL: ● WHOLE CIRCUMFERENCE HEATING AT BOTH SIDES (BOTH SIDES ARE HEATED SIMULTANEOUSLY WITH CURRENT BEING FORWARD DIRECTION) | SYMBOL: * WHOLE CIRCUMFERENCE HEATING AT BOTH SIDES (BOTH SIDES ARE HEATED SIMULTANEOUSLY WITH CURRENT BEING BACKWARD DIRECTION) |
|---|---|---|---|
| ONE | | | |
| TWO | | | |
| THREE | | | | ns
STRESS-RELIEF HEAT TREATMENT APPARATUS

This application is a Continuation of copending application Ser. No. 14/421,707 filed on Feb. 13, 2015, now abandoned, which is the U.S. National Phase of PCT/JP2013/079712, filed Nov. 1, 2013, and which claims priority to Japanese Patent Application No. 2012-252111, filed in Japan on Nov. 16, 2012, and Japanese Patent Application No. 2012-252113, filed in Japan on Nov. 16, 2012, the contents of which are incorporated herein by reference.

TECHNICAL FIELD OF THE INVENTION

The present invention relates to a stress-relief heat treatment apparatus of a welded rail.

RELATED ART

In order to decrease the occurrence of noise or vibration and maintenance cost, generally, a technology in which a joint of a rail is welded and a long rail is formed is used. Here, the name of each portion of the rail will be described with reference to FIGS. 11A and 11B. FIG. 11A is a cross-sectional view which is vertical in a longitudinal direction of a welded rail X, and FIG. 11B is a side view of the welded rail X, that is, a plan view viewed in a direction vertical in the longitudinal direction and a up-down direction of the welded rail X. In addition, in the present invention, the upward direction and the downward direction of the rail indicate the upward direction and the downward direction when the rail is installed and used. The rail X is manufactured by welding at least two rail materials between rail material ends, and includes a weld zone X1. The weld zone X1 includes a welding center X2 which is a portion at which end surfaces of the rail materials abut each other. Moreover, the rail X includes a head X3, a base X4, and a web X5. The head X3 is positioned at an upper portion of the rail X and comes into contact with a wheel. The base X4 is positioned at a lower portion of the rail X and comes into contact with a railroad tie. The web X5 connects the head X3 and the base X4. In addition, the upper end of the web X5 is an intersection line of extension surfaces of a pair (both sides) of lower surfaces of the head X3 and is shown by point A in FIG. 11A. The lower end of the web X5 is an intersection line of extension surfaces of a pair of (both sides) upper surfaces in the base X4, and is shown by point B in FIG. 11A.

For example, when a railroad train such as a freight car repeatedly passes through the rail, a heavy load is applied to the weld zone X1 of the rail X, and thus, fatigue cracks may occur in the horizontal direction in the web X5 of the weld zone X1 or with web X5 as the starting point in the weld zone X1. As one of the reasons why the fatigue cracks occur, there is strong tensile residual stress in the vertical direction generated in the web X5 in the weld zone X1. The tensile residual stress occurs due to a temperature gradient between the weld zone X1 and the periphery thereof when the welding is performed.

As means for decreasing the tensile residual stress of the weld zone and increasing durability of the weld zone of the rail, a method which locally heats a portion distant in the longitudinal direction from the center of the weld zone by a predetermined distance at 500° C. to 1000° C. by a burner is suggested (refer to Patent Document 1). In contrast to the case of the weld zone, since compressive residual stress occurs on the periphery of the weld zone, the residual stress unevenly distributed is offset and the tensile residual stress of the weld zone is decreased by heating the portion distant from the weld zone by the predetermined distance.

In addition, as another method for decreasing the tensile residual stress of the weld zone, a method is also suggested which cools the heated weld zone of the rail using high pressure gas or moisture-containing gas until pearlitic transformation ends, and thereafter, quickly cools the weld zone (refer to Patent Document 2 and Patent Document 3). In this method, the tensile residual stress of the weld zone is decreased by controlling a cooling process of the weld zone. However, the methods disclosed in Patent Document 2 and Patent Document 3 include the process for cooling the heated rail. Accordingly, time and cost required for stress-relief heat treatment for a rail are increased, which is not preferable.

PRIOR ART DOCUMENT

Patent Document

[Patent Document 1] Japanese Unexamined Patent Application, First Publication No. H08-337819
[Patent Document 2] Japanese Unexamined Patent Application, First Publication No. S59-093838
[Patent Document 3] Japanese Unexamined Patent Application, First Publication No. S59-093837

DISCLOSURE OF THE INVENTION

Problems to be Solved by the Invention

However, the tensile residual stress of the weld zone cannot be sufficiently decreased by the above-described methods. In order to further increase the durability of the rail, a method by which the tensile residual stress of the weld zone can be further decreased is required. The present invention is made in consideration of the above-described problem, and an object thereof is to provide a stress-relief heat treatment apparatus capable of effectively decreasing tensile residual stress in a weld zone of a rail.

Means for Solving the Problem

The inventors reviewed the problem, and as a result, the inventors understood that residual stress could be more effectively decreased compared to the related art by suppressing an increase in the temperature of a weld zone itself when the periphery of the weld zone was heated in a stress-relief heat treatment. In addition, the inventors understood that it was necessary to make a heating velocity in the periphery of the weld zone faster in order to suppress the increase in the temperature of the weld zone itself. In addition, since the heating velocity was slow when the periphery of the weld zone of the rail was heated by a burner, the inventors understood that it was effective that the heating was performed at a faster heating velocity in order to further decrease the residual stress. Moreover, the inventors found that a flame comes into contact with the weld zone when the periphery of the weld zone of the rail was heated by a burner and the temperature of the weld zone was increased. In addition, the inventors found that a heating control was more effective than a cooling control in order to decrease the residual stress. The inventors completed the present invention based on the above-described understandings.

(1) A stress-relief heat treatment apparatus according to an embodiment of the present invention for stress-relief heat-treating a rail which is welded includes an induction heating coil, wherein the induction heating coil is arranged at a lateral face of a web of the rail while being separated from a welding center of the rail by 20 mm to 300 mm in a longitudinal direction of the rail.

(2) In the stress-relief heat treatment apparatus according to (1), the stress-relief heat treatment apparatus may include a plurality of the induction heating coils, and the induction heating coils may be arranged at both sides of the welding center along the longitudinal direction of the rail.

(3) In the stress-relief heat treatment apparatus according to (1) or (2), the stress-relief heat treatment apparatus may include a plurality of the induction heating coils, an axial direction of the induction heating coil which is arranged at the rail may be vertical to a surface of the rail, and a plurality of the induction heating coils, of which distances from the welding center along the longitudinal direction of the rail are the same, may be arranged to cover a whole circumference of the rail while being separated from each other.

(4) In the stress-relief heat treatment apparatus according to (1) or (2), an axial direction of the induction heating coil which is arranged at the rail may be parallel to the longitudinal direction of the rail, and the induction heating coil may be arranged to cover a whole circumference of the rail.

(5) In the stress-relief heat treatment apparatus according to (4), the induction heating coil may be arranged at both sides of the welding center along the longitudinal direction of the rail, and a direction of a current flowing in the induction heating coil arranged at one side of the welding center and a direction of a current flowing in the induction heating coil arranged at the other side of the welding center may be opposite to each other.

(6) In the stress-relief heat treatment apparatus according to any one of (1) to (5), a plurality of the induction heating coils, of which the distances from the welding center along the longitudinal direction of the rail are different to each other, may be arranged while being separated from each other at one side or both sides of the welding center.

(7) In the stress-relief heat treatment apparatus according to any one of (1) to (6), a number of turns of the induction heating coil may be two or more.

(8) In the stress-relief heat treatment apparatus according to any one of (1) to (7), a frequency of the current flowing in the induction heating coil may be 1 kHz to 20 kHz.

In the induction heating coil, the heating velocity is fast, and thus, the heat control can be easily performed. Therefore, according to the stress-relief heat treatment apparatus of the present invention, the region separated from the welding center of the rail by a predetermined distance can be heated at a fast heating velocity by the induction heating coil, and it is possible to effectively decrease the residual stress existing in the weld zone of the welded rail. In addition, the induction heating coil can narrow the heated region. Therefore, according to the stress-relief heat treatment apparatus of the present invention, only the region separated from the welding center of the rail by the predetermined distance is heated by the induction heating coil, and thus, an increase in the temperature of the welding center of the rail can be suppressed, and it is possible to effectively decrease the residual stress existing in the welding zone.

In the stress-relief heat treatment apparatus according to an embodiment of the present invention, preferably, the number of turns of the induction heating coil is two or more, or a number of arrangement locations of the induction heating coil is two or more on one side of the welding center. Here, the number of arrangement locations of the induction heating coil becomes the number of arrangement locations in the longitudinal direction of the rail. That is, the plurality of induction heating coils arranged from the welding center by the same distance are arranged at one location. In this way, the induction heating coil wound two times or more or the induction heating coil arranged at two locations or more is arranged, and thus, it is possible to further increase the heating velocity and further decrease the residual stress.

In the stress-relief heat treatment apparatus according to an embodiment of the present invention, the stress-relief heat treatment apparatus includes the plurality of induction heating coils, and preferably, the plurality of induction heating coils are arranged on both sides between which the welding center is interposed. The induction heating coil is arranged on both sides between which the welding center is interposed, and both regions between which the welding center is interposed can be simultaneously heated, and thus, the residual stress can be further decreased, and a time of the stress-relief heat treatment can be shortened.

Effects of the Invention

According to a stress-relief heat treatment apparatus of the present invention, it is possible to effectively decrease residual stress in a weld zone of a rail.

BRIEF DESCRIPTION OF THE DRAWINGS

FIG. 8 is an explanatory view of reference numerals in the graph shown in FIG. 7.

EMBODIMENTS OF THE INVENTION

Subsequently, embodiments exemplifying the present invention will be described with reference to the accompanying drawings.

First Embodiment

Figure 1A:
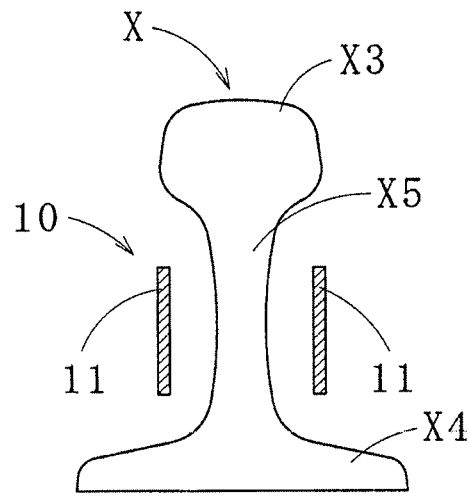
FIG. 1A is a schematic cross-sectional view showing a stress-relief heat treatment apparatus according to a first embodiment of the present invention.
Figure 1B:
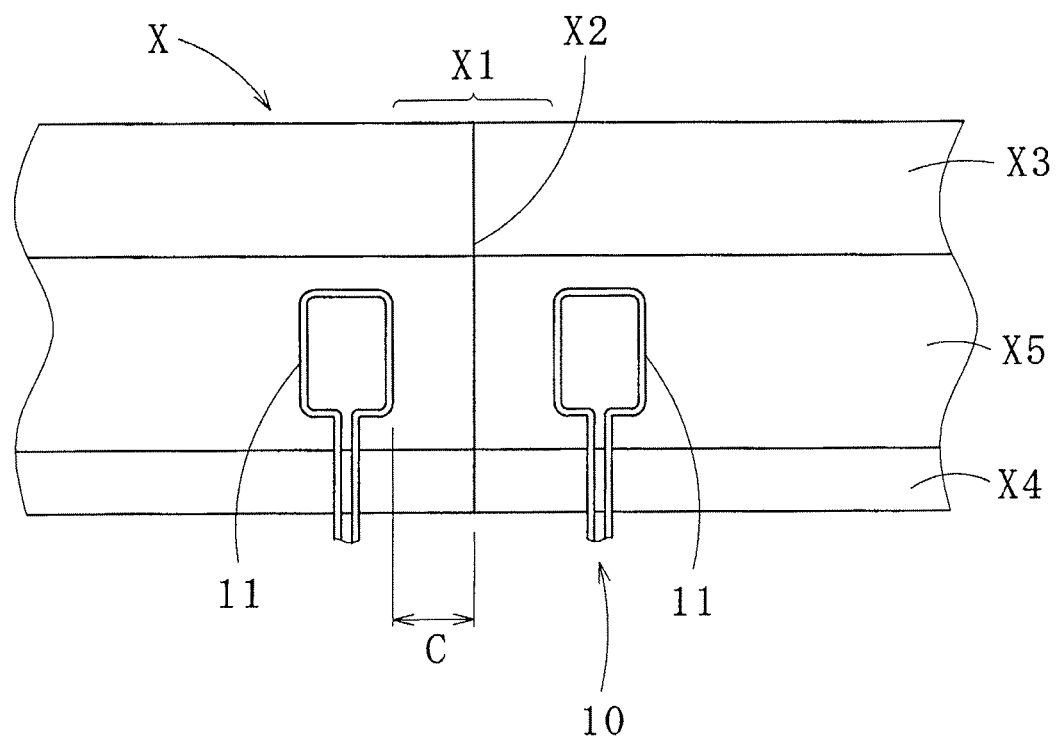
FIG. 1B is a schematic side view showing the stress-relief heat treatment apparatus according to the first embodiment of the present invention.

As shown in FIGS. 1A and 1B, a stress-relief heat treatment apparatus 10 according to a first embodiment of the present invention is a stress-relief heat treatment apparatus of a welded rail X, and includes four induction heating coils 11 and a high-frequency power source (not shown).

(Rail)

First, the rail X will be described, which is an object to be subjected to stress-relief heat treatment. The rail X has a general shape as a railroad rail, and includes a head X3, a base X4, and a web X5 described above. As rail steel forming the rail X, hypo-eutectoid steel, eutectoid carbon steel, or hyper-eutectoid carbon steel having an amount of carbon of approximately 0.6 mass % to 1.0 mass % can be used. The hyper-eutectoid carbon steel (for example, the amount of carbon is 0.85 mass % to 1.0 mass %) has high wear resistance. However, in the hyper-eutectoid carbon steel, toughness is lower, and thus, fatigue cracks are likely to occur. Accordingly, when the stress-relief heat treatment apparatus 10 is used in a rail formed of the hyper-eutectoid carbon steel, a function for decreasing the residual stress can be more effectively exerted.

The rail X is manufactured by welding end surfaces of rails (rail materials) before the welding is performed. An area where the end surfaces of the rail materials abut each other and are welded is defined as a welding center X2. A welding method is not particularly limited, and well-known methods such as flash-butt welding, gas pressure welding, enclosed arc welding, and thermit welding may be used. The flash-butt welding is a welding method for jointing the rail materials by melting the end surfaces of the rail materials in which a voltage is applied to the rail materials (materials to be welded) arranged in a state where end surfaces oppose each other and are separated from each other through an electrode, and arc is generated between the end surfaces, and subsequently, pressurizing the end surfaces of the rail materials along the longitudinal direction in the state where the end surfaces of the rail materials abut each other. The gas pressure welding is a method in which lateral faces of the rail materials on the periphery of the end surface are heated by a burner in a state where the end surfaces of the rail materials abut each other and the end surfaces are pressurized, and end surfaces are pressure-welded in a high temperature state. The enclosed arc welding is a method for welding a rail material in which end surfaces of rail materials are arranged to oppose each other in a state where the end surfaces are provided with a gap of approximately 10 mm to 20 mm, the gap is enclosed by a dolly block, the welding is performed using a welding rod, and thus, the rail materials are welded. The thermit welding is a method in which end surfaces of rail materials are arranged to oppose each other in a state where the end surfaces are provided with a gap of approximately 20 mm to 30 mm, the gap is surrounded by a mold, molten steel is generated by a chemical reaction between aluminum and iron oxide in a crucible arranged above the mold, the end surfaces of the rail materials are melted by injecting the molten steel into the mold, and the rail materials are welded.

Among the above-described welding methods, in the flash-butt welding, the residual stress in the vertical direction in the web X5 of the rail is most significantly generated. This is because the temperature gradient between the weld zone X1 and the periphery thereof is increased when the flash-butting welding is performed. Accordingly, when the stress-relief heat treatment apparatus 10 is used in a rail which is joined using the flash-butt welding, the function for decreasing the residual stress can be more effectively exerted.

In addition, a width of Heat-Affected Zone (HAZ) in the weld zone X1 of the rail X is not particularly limited. For example, the stress-relief heat treatment apparatus 10 can be suitably applied to a rail in which the width of HAZ is 5 mm to 150 mm.

(Induction Heating Coil)

The induction heating coil 11 heats at least the web X5 of the rail X, and the well-known induction heating coil may be used. Here, the plurality of induction heating coils 11 may be the same as one another, and may be different from one another. In general, the induction heating coil 11 is formed of a metal wire or a metal pipe. For example, as the induction heating coil 11, a copper coil may be used, or a coil which is manufactured by processing a metal pipe such as a copper pipe into a coil shape (a pipe coil) may be used. When a dielectric heating coil adopting the pipe coil is used, the dielectric heating coil is used while cooling water passes into the inner portion of the pipe, and thus, the increase in the temperature of the coil itself and/or other portions can be suppressed.

The shape of the induction heating coil 11 is not particularly limited. Accordingly, for example, the shape of the induction heating coil 11 viewed in an axial direction may be a circular shape, an elliptical shape, an approximately square shape, an approximately rectangular shape, or other polygonal shapes. Among the above-described shapes, the preferable shape of the induction heating coil 11 viewed in an axial direction is the circular shape, the elliptical shape, or the approximately square shape, since the shapes can effectively heat the web X5 of the rail X. Moreover, when the number of turns of the induction heating coil 11 is two or more, the induction heating coil 11 may be wound helically, or may be wound spirally.

The size of the induction heating coil 11 may be appropriately set according to the size of the rail X. For example, in the case where the shape of the induction heating coil 11 viewed in an axial direction is the circular shape, the elliptical shape, the approximately square shape, or the approximately rectangular shape, an outer diameter, a major axis, or a length of the side of the shape viewed in the axial direction may be approximately 20 mm to 150 mm. Moreover, the cross-sectional shape of the metal wire or the metal pipe forming the induction heating coil 11 is not particularly limited, and may be a circular shape, an elliptical shape, an approximately square shape, or an approximately rectangular shape. The outer diameter, the major axis, or the length of a side of the metal wire or the metal pipe may be approximately 5 mm to 40 mm.

The number of turns of the induction heating coil 11 may be one or more, and preferably, is two or more. When the number of turns is two or more, a heating velocity is increased, and the residual stress can be more effectively decreased. Moreover, an upper limit in the number of turns is not particularly limited, and for example, the upper limit in the number of turns may be five.

It is not possible to make the induction heating coil 11 directly come into contact with the rail X. If the induction heating coil 11 directly comes into contact with the rail X, a short circuit occurs between the induction heating coil 11 and the rail X. This is an obvious matter to a person skilled in the art. Accordingly, it is necessary to separate the induction heating coil 11 and the rail X from each other by a distance in which a state where the induction heating coil and the rail are electrically insulated from each other can be secured. Alternatively, when the induction heating coil 11 and the rail X come into contact with each other, it is necessary to arrange an insulator between the induction heating coil 11 and the rail X. In the present invention, it is considered that the description such as the induction heating coil "being arranged" or "being installed" to the rail indicates the induction heating coil being arranged to the rail in the state where the electrical insulation of the induction heating coil with respect to the rail is secured.

(Arrangement Location of Induction Heating Coil)

When the stress-relief heat treatment apparatus 10 is used, the induction heating coil 11 is arranged on the lateral face of the rail X in the state of being separated from the welding center X2 of the rail X in the longitudinal direction by a predetermined distance. The axial direction of the induction heating coil 11 arranged on the lateral face of the rail X is vertical to the lateral face of the rail X. A distance C between the welding center X2 and each induction heating coil 11 (the shortest distance between the welding center X2 and each induction heating coil 11) is 20 mm to 300 mm. Preferably, a lower limit of the distance C is equal to or more than 30 mm, and more preferably, is equal to or more than 50 mm. As described above, in the rail X before the stress-relief heat treatment is performed, the tensile residual stress exists on the weld zone X1 which is centered around the welding center X2, and the compressive residual stress exists on the periphery of the weld zone X1. That is, in the rail X before the stress-relief heat treatment is performed, the residual stress is unevenly distributed. Each induction heating coil 11 is arranged above the lateral faces of the rail X in the state where the induction heating coil is separated from the welding center X2 of the rail X in the longitudinal direction by a predetermined distance C, and thus, when the stress-relief heat treatment (heating) is performed, the periphery of the weld zone X1 is appropriately heated, and thus, the residual stress unevenly distributed is offset, and it is possible to effectively decrease the tensile residual stress existing in the weld zone.

Moreover, in the stress-relief heat treatment apparatus 10 according to the present embodiment, on one side and the other side of the welding center X2, two induction heating coils 11 are arranged on both lateral faces of the rail X in the state where the distances C between the welding center X2 and each induction heating coil 11 are the same as each other. That is, the distance between each of the plurality of induction heating coils 11 arranged on one side of the welding center X2 and the welding center X2 becomes one value. In this case, it is considered that the number of arrangement locations of the induction heating coil 11 is one. When the distance between each of the plurality of induction heating coils 11 arranged on one side of the welding center X2 and the welding center X2 is N kinds, it is considered that the number of arrangement locations in the induction heating coil 11 is N locations. In this way, in the present invention, it is considered that the "number" and the "number of arrangement locations" with respect to the induction heating coil have different concepts from each other. These matters are also applied to other embodiments according to the present invention.

Figure 2A:
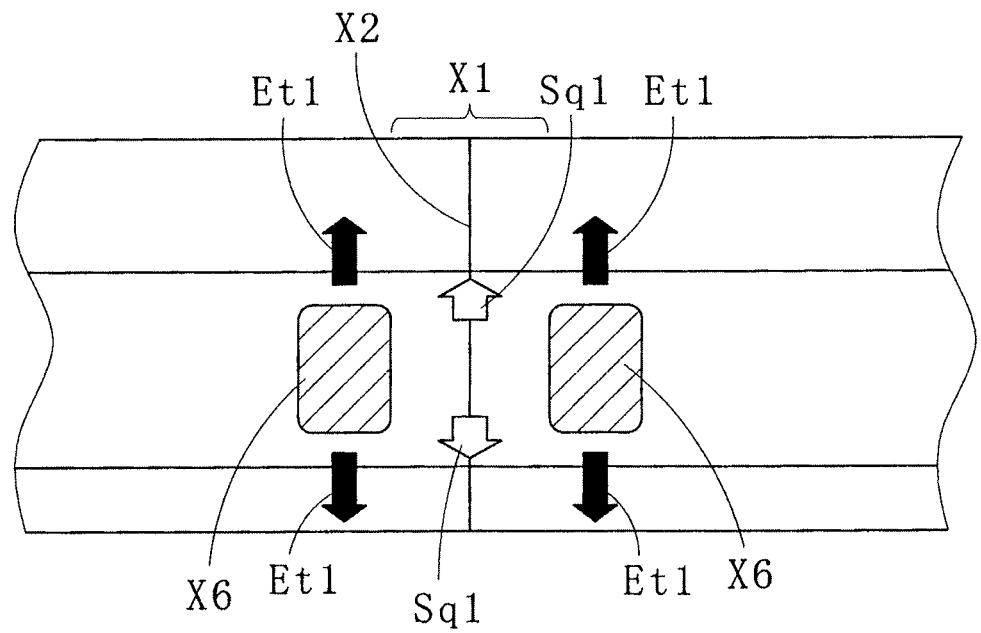
FIG. 2A is a schematic view showing a configuration for decreasing residual stress by the stress-relief heat treatment apparatus.
Figure 2B:
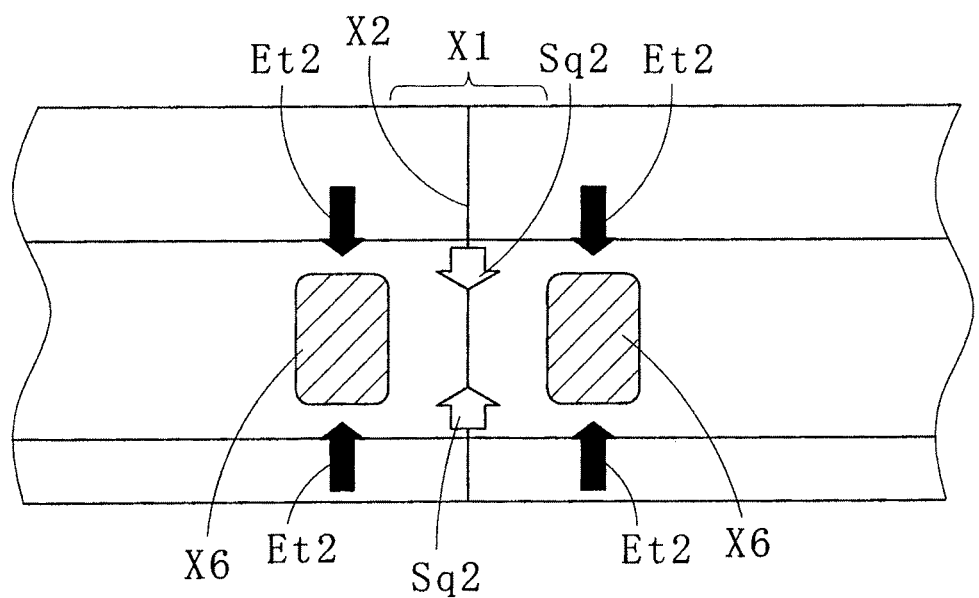
FIG. 2B is a schematic view showing the configuration for decreasing the residual stress by the stress-relief heat treatment apparatus.

A configuration for decreasing the residual stress of the weld zone X1 by the stress-relief heat treatment apparatus according to the present embodiment will be described with reference to FIGS. 2A and 2B. When a periphery X6 which is in the vicinity of the weld zone X1 is heated, first, in the periphery X6, expansion strain Et1 is generated in at least the vertical direction by the increase in the temperature (refer to FIG. 2A). Tensile stress Sq1 is vertically generated in the weld zone X1 by the expansion strain Et1. However, in the periphery X6, since the yield point is decreased as the temperature is increased, the compressive plastic deformation is generated, and the tensile stress Sq1 is reduced during the increase in the temperature (heating). Subsequently, in a cooling process after the heating is performed, constriction strain Et2 is generated in the vertical direction in the periphery X6 according to the decrease of the temperature in the periphery X6 (FIG. 2B). Compressive stress Sq2 is generated in the weld zone X1 by the constriction strain Et2, and the tensile residual stress in the weld zone X1 is decreased.

In order to effectively decrease the residual stress, it is necessary to increase the expansion strain Et1 and the constriction strain Et2 on the periphery of the weld zone and to decrease the expansion strain and the constriction strain of the weld zone itself. This is because in a case where large expansion strain and constriction strain are generated in the weld zone when the stress-relief heat treatment is performed, the effects of the expansion strain Et1 and the constriction strain Et2 on the periphery of the weld zone are offset by the expansion strain and the constriction strain of the weld zone, and the tensile stress Sq1 and the compressive stress Sq2 generated in the weld zone are decreased. In order to decrease the expansion strain and the constriction strain of the weld zone itself, it is effective to suppress the increase in the temperature of the weld zone.

In a case where the distance C is less than 20 mm, when the stress-relief heat treatment (heating) is performed, not only the periphery X6 but also the weld zone X1 on which the tensile residual stress exists is strongly heated. In this case, the temperature of the weld zone X1 is increased, and an amount of expansion and an amount of constriction in the weld zone X1 are increased. Accordingly, the compression stress Sq2 applied to the weld zone X1 by the constriction strain Et2 of the periphery X6 is decreased. Therefore, when the distance C is less than 20 mm, it is not possible to effectively decrease the tensile residual stress. On the other hand, when the distance C exceeds 300 mm, heating is performed with deviating from the portion on which the residual stress exists (weld zone X1) significantly, the effect of the constriction strain Et2 is not easily operated in the weld zone X1, the compressive stress Sq2 is decreased, and thus, it is not possible to effectively decrease the tensile residual stress of the weld zone X1.

Accordingly, the induction heating coil 11 is arranged on the lateral face of the web of the rail in the state where the induction heating coil is formed to be separated from the welding center of the rail in the longitudinal direction of the rail by 20 mm to 300 mm. In the present embodiment, four induction heating coils 11 are arranged to oppose so as to interpose the web X5 on both sides between which the welding center X2 of the rail X is interposed to each other. That is, a pair of induction heating coils 11 is arranged at one location (that is, the number of arrangement locations of the induction heating coil 11 on both sides of the welding center X2 is one) on each of both sides of the welding center X2. At this time, in a state where the induction heating coil 11 and the web X5 come into non-contact with each other (that is, the induction heating coil 11 and the web 5 are slightly separated from each other), the axial direction of the induction heating coil 11 is arranged to be vertical to the surface of the web X5. Moreover, each induction heating coil 11 is arranged at an approximately intermediate height of the web X5. In this way, when the induction heating coils 11 are arranged to oppose each other while interposing the web X5 therebetween, if an alternating current flows into the induction heating coil 11, alternating flux is generated between the pair of induction heating coils 11 interposing the web X5 therebetween, and thus, it is possible to effectively heat the web X5.

As described above, it is necessary to arrange each induction heating coil 11 on at least the lateral face of the web X5. Even when the induction heating coil 11 is arranged on only the head X3 and/or the base X4, it is not possible to sufficiently obtain the above-described effects for decreasing the tensile residual stress. In addition, as described above, preferably, the pair of induction heating coils 11 is arranged to oppose each other while interposing the web X5 therebetween. However, even when one induction heating coil 11 is arranged on only one side of the web X5, it is possible to apply a heat quantity required for decreasing the tensile residual stress of the weld zone X1 to the web X5.

Preferably, each induction heating coil 11 is arranged on both sides of the welding center X2, and more preferably, the induction heating coils are arranged at positions which are equal distances (symmetrical to) from the welding center X2. Accordingly, it is possible to uniformly heat both sides of the welding center X2, the offset of the residual stress can be more effectively performed, and as a result, it is possible to further decrease the residual stress in the weld zone X1. However, even when the distance between the induction heating coil 11 arranged at one side of the welding center X2 and the welding center X2, and the distance between the induction heating coil 11 arranged at the other side of the welding center X2 and the welding center X2 are different from each other, it is possible to decrease the residual stress in the weld zone X1. In addition, even when the induction heating coil 11 is arranged on only one side with respect to the welding center X2, it is possible to decrease the residual stress in the weld zone X1. In this case, first, heating is performed in a state where the induction heating coil 11 is arranged on one side of the welding center X2, thereafter, heating is performed in a state where the induction heating coil 11 is arranged on the other side of the welding center X2, and thus, effects similar to those when each of the induction heating coils 11 is arranged on both sides of the welding center X2 can be obtained.

(High-Frequency Power Source)

The high-frequency power source is electrically connected to the induction heating coil 11, and causes a high-frequency current to flow into the induction heating coil 11. As long as the high-frequency power source generates a high-frequency current having a predetermined frequency, various kinds of power sources can be used. As examples of the high-frequency power source, there are transistor type, thyristor type, and electron tube type high-frequency power sources.

When the stress-relief heat treatment apparatus includes the plurality of induction heating coils 11, each induction heating coil 11 and the high-frequency power source may be connected in parallel in a state where the frequency and the direction of the current flowing into each induction heating coil 11 can be individually controlled. Moreover, four induction heating coils 11 may be connected to the high-frequency power source in series. In addition, when the induction heating coils 11 are arranged to oppose each other while interposing the web X5 therebetween, preferably, the induction heating coils 11 are connected to each other so that the current flows in the same direction with respect to each of the induction heating coil 11 (that is, so that the alternating flux in the same direction is generated).

The stress-relief heat treatment apparatus may not include the high-frequency power source. When the high-frequency power source is not included, the stress-relief heat treatment apparatus may be used by being connected to an external high-frequency power source.

(Other Configurations)

The stress-relief heat treatment apparatus 10 may further include a fixing unit of the induction heating coil 11, a position movement unit of the induction heating coil 11, and a temperature measurement unit (for example, a thermocouple or a radiation-type thermometer) of a heated portion.

The fixing unit and the position movement unit are not particularly limited as long as the fixing and the position movement of the induction heating coil 11 can be performed. Preferably, the fixing unit and the position movement unit are configured to move the induction heating coil 11 in the longitudinal direction, the width direction, and the height direction (vertical direction) of the rail X. According to this configuration, the arrangement location of the induction heating coil 11 is changed according to the size or the welding method of the rail X, and thus, it is possible to heat an appropriate position.

(Usage Method of Stress-Relief Heat Treatment Apparatus 10)

Next, a usage method of the stress-relief heat treatment apparatus 10 will be described. As described above, the induction heating coil 11 of the stress-relief heat treatment apparatus 10 is arranged at a predetermined position of the welded rail X. Moreover, this arrangement may be performed so that the induction heating coil 11 moves with respect to the fixed rail X or the rail X moves with respect to the fixed stress-relief heat treatment apparatus 10. In the latter case, for example, in shop welding, the stress-relief heat treatment apparatus 10 is arranged at the downstream side of the welding apparatus, the rail X continuously moves, and thus, the induction heating coil 11 can be arranged at a predetermined position.

After the induction heating coil 11 is arranged at the predetermined position, an alternating current flows into the induction heating coil 11, and thus, as described above, it is possible to heat the web X5 by induction heating. In this case, preferably, the alternating current flows in the same direction with respect to a total of two pairs of induction heating coils 11 opposing each other while interposing the web X5 therebetween. Accordingly, it is possible to generate the alternating flux in the same direction between the induction heating coils 11.

Preferably, a rail heating velocity by the induction heating coil 11 is 2.0° C./s or more, more preferably, is 2.5° C./s or more, and most preferably, is 2.8° C./s or more. In this way, the heating is performed at a high heating velocity, and thus, the increase in the temperature of the weld zone X1 is prevented, and it is possible to sufficiently decrease the residual stress. In addition, in the stress-relief heat treatment apparatus 10, since the heating is performed using the induction heating coil 11, it is possible to increase the heating velocity. Considering capacity of the induction heating coil 11, for example, the upper limit of the heating velocity is approximately 5.0° C./s. However, the upper limit is not particularly limited.

For example, the heating by the induction heating coil 11 can be performed to a heating temperature of 400° C. or higher and 750° C. or lower. Here, the "heating temperature" according to the present invention is the maximum temperature in the heated portion. When the heating temperature is less than 400° C., there is a concern that effects for decreasing the residual stress may be decreased. On the other hand, when the heating temperature exceeds 750° C., there is a concern that the heated portion may be excessively softened, which is not preferable. After the rail is heated from room temperature to the heating temperature, the heating stops, and the rail may be cooled by natural cooling. If the stress-relief heat treatment apparatus 10 is used, it is possible to sufficiently decrease the residual stress by only the heating control without performing a specific cooling control.

As described above, according to the stress-relief heat treatment apparatus 10, it is possible to heat the region, which is separated from the welding center X2 of the rail X in the longitudinal direction of the rail X by the predetermined distance C, at a fast heating velocity by the induction heating coil 11. Accordingly, it is possible to effectively decrease the residual stress existing on the weld zone X1 of the welded rail X. In addition, when a burner is used as the heating unit, the heating velocity is low, and it is difficult to heat only a desired region. Since a flame of the burner heats a wide range, when the burner is used as the heating unit, the flame abuts not only the region separated from the welding center X2 by the predetermined distance but also the welding center X2, and thus, the increase in the temperature of the welding center X2 is large. On the other hand, since controllability of the heating region is improved in the induction heating coil 11, according to the stress-relief heat treatment apparatus 10 having the induction heating coil 11, a desired region (the region separated from the welding center X2 by the predetermined distance) is heated, it is possible to suppress the increase in the temperature of the welding center X2, and it is possible to effectively decrease the residual stress. Moreover, when the induction heating coils 11 of the stress-relief heat treatment apparatus 10 are arranged on both sides in the longitudinal direction of the rail while interposing the welding center 2 therebetween, it is possible to simultaneously heat the two regions. In this case, since the heating velocity is fast and the offset of the residual stress is uniformly performed, it is possible to further decrease the residual stress, and it is possible to shorten the time of the stress-relief heat treatment.

In addition, in the stress-relief heat treatment apparatus 10, the induction heating coil 11 does not cover a whole circumference of the rail X, and is configured to be arranged on only the right and left sides of the web X5. Accordingly, the stress-relief heat treatment apparatus 10 can be easily arranged on the rail X which is subjected to the stress-relief heat treatment, and the stress-relief heat treatment apparatus can be suitably used for not only the stress-relief heat treatment with respect to the shop welding but also the stress-relief heat treatment with respect to the welding in a site in which the rail is installed.

Second Embodiment

Figure 3A:
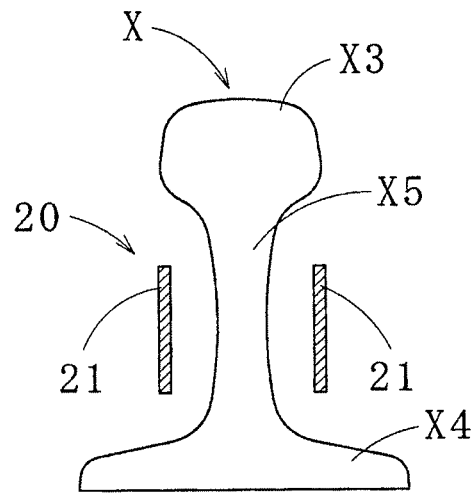
FIG. 3A is a schematic cross-sectional view showing a stress-relief heat treatment apparatus according to a second embodiment of the present invention.
Figure 3B:
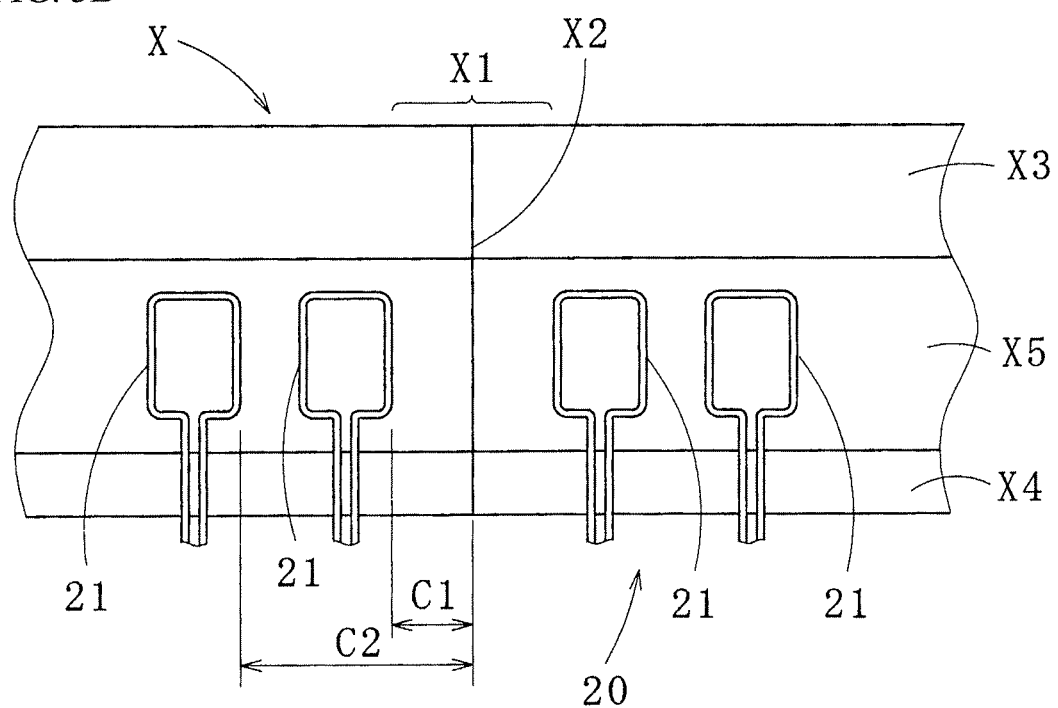
FIG. 3B is a schematic side view showing the stress-relief heat treatment apparatus according to the second embodiment of the present invention.

As shown in FIGS. 3A and 3B, a stress-relief heat treatment apparatus 20 according to a second embodiment of the present invention is a stress-relief heat treatment apparatus of the welded rail X, and includes eight induction heating coils 21 and a high-frequency power source (not shown). The stress-relief heat treatment apparatus 20 is similar to the a stress-relief heat treatment apparatus 10 shown in FIGS. A and 1B except for the number of the induction heating coils 21 and the number of the arrangement locations.

Eight induction heating coils 21 are a total of four pairs of induction heating coils 21 which are arranged to oppose each other while interposing the web X5 therebetween. In addition, the four pairs of induction heating coils are distributed two by two on both sides between which the welding center X2 of the rail X is interposed. At this time, in a state where the induction heating coil 21 and the web X5 come into non-contact with each other (that is, the induction heating coil 11 and the web X5 are slightly separated from each other), the axial direction of the induction heating coil 21 is vertical to the surface of the web X5. In addition, preferably, four induction heating coils 21 positioned on the same surface side of the web X5 are arranged on approximately the same straight line with an approximately intermediate height of the web X5. That is, in the stress-relief heat treatment apparatus 20, four pairs of induction heating coils 21 are respectively arranged at two locations on each of both sides of the welding center X2. In addition, the plurality of induction heating coils 21 are arranged to be symmetrical with respect to the welding center X2. In addition, the distances (C1 and C2) of the induction heating coils 21 separated from the welding center X2 are within a range of 20 mm to 300 mm. Moreover, in the stress-relief heat treatment apparatus 20, the number of arrangement locations of the induction heating coil 21 on one side of the welding center X2 is two (the arrangement location at which the distance from the welding center X2 is C1 and the arrangement location at which the distance from the welding center X2 is C2).

All the induction heating coils 21 are the same as one another. However, the induction heating coils may be different from each other. For example, the size, the number of turns, and the shape of each induction heating coil may be changed according to the distance between the heated location and the welding center X2.

The stress-relief heat treatment apparatus 20 includes eight induction heating coils 21, the induction heating coils are used by being arranged at two locations on each of both sides of the welding center X2, and thus, it is possible to further increase the heating velocity, and it is possible to more effectively decrease the residual stress.

Third Embodiment

Figure 4A:
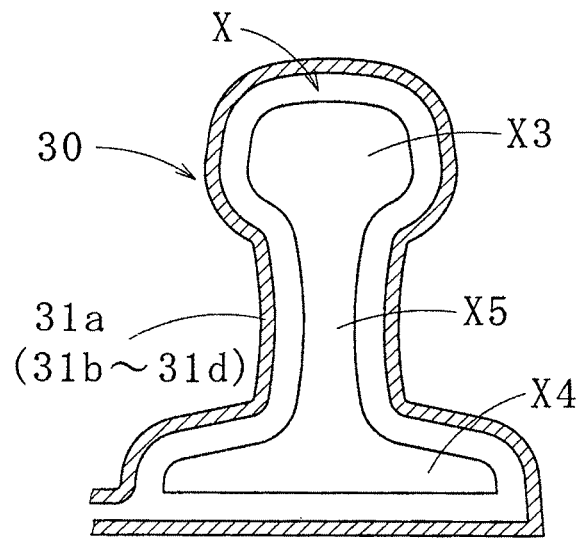
FIG. 4A is a schematic cross-sectional view showing a stress-relief heat treatment apparatus according to a third embodiment of the present invention.
Figure 4B:
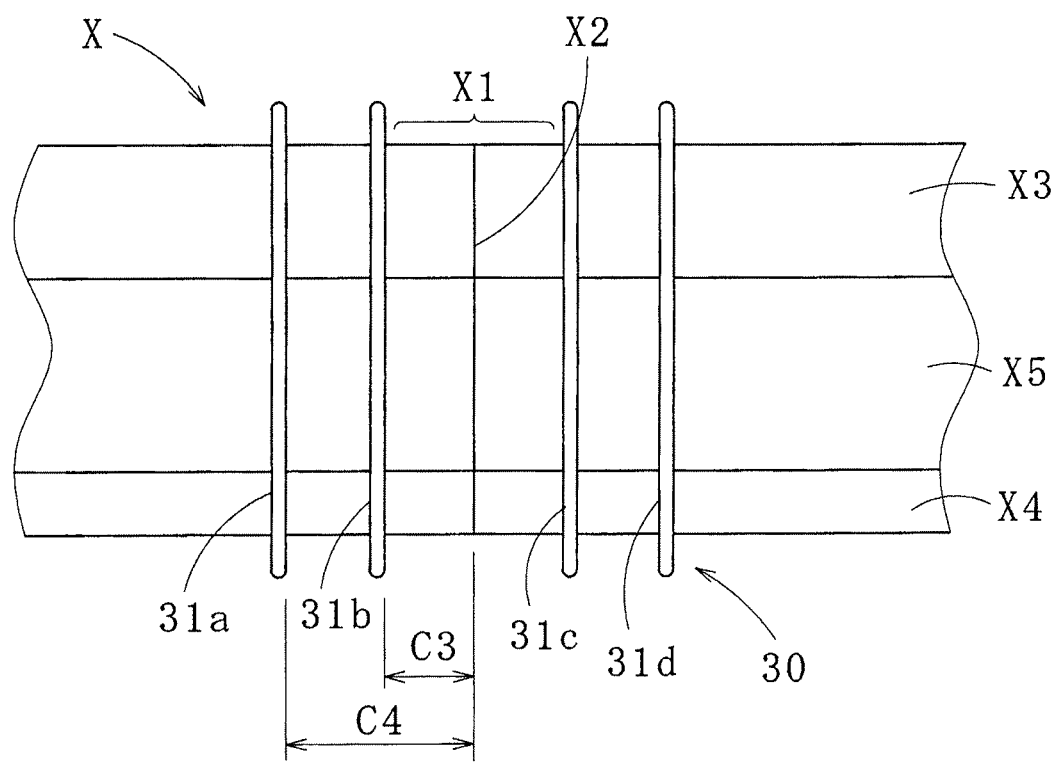
FIG. 4B is a schematic side view showing the stress-relief heat treatment apparatus according to the third embodiment of the present invention.

As shown in FIGS. 4A and 4B, a stress-relief heat treatment apparatus 30 according to a third embodiment of the present invention is a stress-relief heat treatment apparatus of the welded rail X, and includes four induction heating coils 31a to 31d and a high-frequency power source (not shown). The stress-relief heat treatment apparatus 30 is similar to the stress-relief heat treatment apparatus 10 shown in FIGS. 1A and 1B except for the number and the shape of the induction heating coils 31a to 31d.

(Induction Heating Coil)

When each of the induction heating coils 31a to 31d is arranged at the rail X, the axial direction of the coil is parallel to the longitudinal direction of the rail X, and the induction heating coil may have a shape covering the whole circumference of the rail X. Specifically, each of the induction heating coils 31a to 31d installed above the rail X has a structure in which the shape viewed in the axial direction is an enlarged shape approximately similar to the cross-sectional outer edge of the rail X. Moreover, the number of turns in each of the induction heating coils 31a to 31d is one.

The size of each of the induction heating coils 31a to 31d is not particularly limited. However, for example, the size of the shape viewed in the axial direction may be 1.2 times to 2 times by a homothetic ratio with respect to the outer edge of the cross section of the rail X, which is vertical in the longitudinal direction. In addition, the cross-sectional shape of the metal wire or the metal pipe forming each of the induction heating coils 31a to 31d is not particularly limited, and, for example, may be a circular shape, an elliptical shape, an approximately square shape, or an approximately rectangular shape. Moreover, among the shapes, preferably, the shape is the approximately square shape. Each of the induction heating coils 31a to 31d is arranged to cover the rail X in the state where the axial direction thereof is parallel to the longitudinal direction of the rail X, and when the metal wire or the metal pipe in which the cross section is an approximately square shape is used as the material of each of the induction heating coils 31a to 31d, it is possible to uniformize the distances from the inner surfaces of the induction heating coils 31a to 31d to the surface of the rail X. Accordingly, the present embodiment is preferable since the density of a magnetic flux generated on the surface of the rail X is uniformized, and the heating of the rail X is more uniformly performed. The outer diameter, the major axis, or the length of the long side in the cross section of the metal wire or the metal pipe may be approximately 5 mm to 40 mm.

Each of the induction heating coils 31a to 31d may be configured to be divided into two or more. In this way, when each of the induction heating coils 31a to 31d can be divided, the arrangement and the removal of each of the induction heating coils 31a to 31d to a predetermined position with respect to the welded rail X can be easily performed. Moreover, as described above, the number of turns of each of the induction heating coils 31a to 31d is one. However, an induction heating coil having the number of turns of one or more may be used for the stress-relief heat treatment apparatus 30. By changing the number of turns of the induction heating coil, it is possible to change the width of the region heated by the induction heating coil along the longitudinal direction of the rail.

(Arrangement Location of Induction Heating Coil)

In the stress-relief heat treatment apparatus 30, when the stress-relief heat treatment is used, four induction heating coils 31a to 31d are distributed two by two on each of both sides between which the welding center X2 of the rail X is interposed along the longitudinal direction of the rail X. In addition, four induction heating coils 31a to 31d are arranged in a state of being separated from the welding center X2 by a predetermined distance in the longitudinal direction. In addition, each of the induction heating coils 31a to 31d is arranged to cover the whole circumference of the rail X in a state where the axial direction of the coil is parallel to the longitudinal direction of the rail X. The distance between each of the induction heating coils 31b and 31c arranged at the side close to the welding center X2 and the welding center X2 is defined as C3, and the distance between each of the induction heating coils 31a and 31d arranged at the side remote from the welding center X2 and the welding center X2 is defined as C4. Here, the distances C3 or C4 between the welding center X2 and each of the induction heating coils 31a to 31d are referred to as the shortest distance between the welding center X2 and each of the induction heating coils 31a to 31d. Moreover, in the stress-relief heat treatment apparatus 30, the number of arrangement locations of the induction heating coil 31 on one side of the welding center X2 becomes two (the position at which the distance from the welding center X2 becomes C3 and the position at which the distance from the welding center X2 becomes C4).

The distances C3 and C4 between the welding center X2 and each of the induction heating coils 31a to 31d are 20 mm to 300 mm. Preferably, the lower limit of the distance between the welding center X2 and each of the induction heating coils 31a to 31d is 30 mm, and more preferably, is 50 mm. In the rail X before the stress-relief heat treatment is performed, as the residual stress in the vertical direction (up-down direction), tensile residual stress exists in the weld zone X1 which has the welding center X2 as the center, and compressive residual stress exists in the vicinity of the weld zone X1. Accordingly, in this way, the induction heating coils 31a to 31d are arranged in the state of being separated from the welding center X2 by the predetermined distance C3 or C4, and thus, when the stress-relief heat treatment (heating) is performed, it is possible to appropriately heat the vicinity of the weld zone X1 (that is, the welding center X2 and the vicinity thereof), the residual stress unevenly distributed is offset, and it is possible to effectively decrease the tensile residual stress existing in the weld zone.

In the third embodiment, the mechanism for decreasing the residual stress is substantially similar to the mechanism in the first embodiment. However, in the stress-relief heat treatment apparatus 30 according to the third embodiment, during the cooling after the heating, it is possible to apply the compressive stress Sq2 stronger than that of the stress-relief heat treatment apparatus according to the first embodiment to the weld zone X1. This reason is as follows.

Also in the stress-relief heat treatment apparatus 30, the regions covered by the induction heating coils 31a to 31d are heated by the induction heating generated by causing an alternating current to flow into the induction heating coils 31a to 31d. The regions to be heated are the regions distant from the welding center X2 by distances C3 and C4. At this time, the stress-relief heat treatment apparatus 30 heats the whole circumference of the region to be heated including not only the web X5 but also the head X3 and the base X4. In this case, since the heating is performed over a wider region along the height direction of the web X5, during the cooling after the heating, it is possible to apply stronger compressive stress to the weld zone X1. Therefore, according to the stress-relief heat treatment apparatus 30, the offset of the residual stress is more effectively performed, and it is possible to further decrease the tensile residual stress in the weld zone X1.

In addition, in this way, the whole circumference of the region to be heated of the rail X is heated, and the effect that decreases the residual stress in the longitudinal direction of the rail X is also exerted. In the stress-relief heat treatment, for example, when only the web X5 is heated, the tensile residual stress in the longitudinal direction is generated in the web X5 of the weld zone X1, and the compressive residual stress in the longitudinal direction is generated in the head X3 and the base X4 of the weld zone X1. However, as described above, the whole circumference is heated, and thus, it is also possible to decrease the residual stress in the longitudinal direction. When only the web X5 is locally heated, during the cooling after the heating, the web X5 which is the region to be heated is largely shrunk in the longitudinal direction. However, the constriction in the longitudinal direction of the head X3 and the base X4 being heated is relatively small. As a result, since the constriction in the longitudinal direction of the web X5 is restrained by other portions (head X3 or base X4), the residual stress in the longitudinal direction is generated. However, the whole circumference of the rail X is heated using the stress-relief heat treatment apparatus 30, and thus, the increases in the temperatures of the head X3, the base X4, and the web X5 are uniformized and the constriction in the longitudinal direction during the cooling is also uniformized, and the increase of the residual stress in the longitudinal direction is suppressed.

In the case where the distance C3 is less than 20 mm, when the stress-relief heat treatment (heating) is performed, the increase in the temperature of the weld zone X1 in which the tensile residual stress exists is large, and the amount of expansion and the amount of constriction in the weld zone X1 are increased. In this case, since the compressive stress Sq2 applied to the weld zone X1 by the constriction strain Et2 of the periphery X6 (the regions heated by the induction heating coils 31a to 31d) is decreased, it is not possible to effectively decrease the tensile residual stress. In the case where the distance C4 exceeds 300 mm, heating is performed with deviating from the portion on which the residual stress exists (weld zone X1) significantly. Accordingly, the effect of the constriction strain Et2 is not easily applied to the weld zone X1, the compressive stress Sq is decreased, and it is not possible to effectively decrease the tensile residual stress of the weld zone X1.

Preferably, each of the induction heating coils 31a to 31d is arranged on both sides of the welding center X2, and more preferably, is arranged at a position which is positioned at the distance equal (symmetrical) to the welding center X2. Accordingly, it is possible to uniformly heat both sides of the welding center X2, the offset of the residual stress is more effectively performed, and as a result, it is possible to further decrease the residual stress in the weld zone X1. However, even when the distance between each of the induction heating coils 31a and 31b arranged on one side of the welding center X2 and the welding center X2, and the distance between each of the induction heating coils 31c and 31d arranged on the other side of the welding center X2 and the welding center X2 are different from each other, it is possible to decrease the residual stress in the weld zone X1. In addition, even when the induction heating coil is arranged on only one side with respect to the welding center X2, it is possible to decrease the residual stress in the weld zone X1. In this case, first, heating is performed in a state where the induction heating coil is arranged on one side of the welding center X2, thereafter, heating is performed in a state where the induction heating coil is arranged on the other side of the welding center X2, and thus, effects similar to those when the induction heating coils are arranged on both sides of the welding center X2 can be obtained.

Preferably, the number of arrangement locations of the induction heating coils 31a and 31d is two or more on one side of the welding center X2. However, even when the number of arrangement locations on one side of the welding center X2 is one, it is possible to obtain the effects according to the object of the present invention.

(High-Frequency Power Source)

A high-frequency power source which is electrically connected to each of the induction heating coils 31a to 31d can use the high-frequency power source similar to the high-frequency power source according to the first embodiment. Each of the induction heating coils 31a to 31d and the high-frequency power source may be connected to each other in parallel in a state where the frequency and the direction of the current flowing into each of the induction heating coils 31a to 31d can be individually controlled.

Alternatively, four induction heating coils 31a to 31d may be connected to the high-frequency power source in series.

Moreover, in the stress-relief heat treatment apparatus 30, when the number of arrangement locations of the induction heating coil on one side in the welding center X2 is two or more, preferably, the directions in which the alternating currents of the induction heating coils flow are the same as each other. That is, preferably, the directions of the alternating currents flowing into the induction heating coil 31a and the induction heating coil 31b (the induction heating coil 31c and the induction heating coil 31d are also similarly applied) positioned on the same side with respect to the welding center X2 are the same as each other. Accordingly, two induction heating coils 31a and 31b are integrated with each other, the alternating flux is formed, and it is possible to effectively heat the region between the induction heating coils 31a and 31b. Moreover, preferably, the directions of the alternating currents flowing into the induction heating coils 31a and 31b and the induction heating coils 31c and 31d which are positioned at the side opposite to each other with respect to the welding center X2 are opposite to each other. Accordingly, the direction of the alternating flux of each of the induction heating coils 31a and 31b and the direction of the alternating flux of each of the induction heating coils 31c and 31d are opposite to each other. In this case, since the density of the alternating flux generated in the weld zone X1 positioned between two induction heating coils 31b and 31c is decreased, it is possible to prevent the increase in the temperature of the weld zone X1. Accordingly, it is possible to more effectively decrease the residual stress of the weld zone X1.

(Other Configurations)

The stress-relief heat treatment apparatus 30 may further include a fixing unit and a position movement unit of each of the induction heating coils 31a to 31d, and a temperature measurement unit (for example, a thermocouple or a radiation-type thermometer) of a heated portion.

The fixing unit and the position movement unit are not particularly limited as long as the fixing and the position movement of each of the induction heating coils 31a to 31d can be performed. Preferably, the fixing unit and the position movement unit are configured to move each of the induction heating coils 31a to 31d in the longitudinal direction of the rail X. Accordingly, it is possible to heat an appropriate position according to the size or the welding method of the rail. Moreover, when each of the induction heating coils 31a to 31d is configured to be divided into two or more, the fixing unit and the position-fixing unit may be provided in every portion which is divided.

(Usage Method of Stress-Relief Heat Treatment Apparatus 30)

Next, a usage method of the stress-relief heat treatment apparatus 30 will be described. As described above, each of the induction heating coils 31a to 31d of the stress-relief heat treatment apparatus 30 is arranged at a predetermined position of the welded rail X. Moreover, this arrangement may be performed so that each of the induction heating coils 31a to 31d moves with respect to the fixed rail X or the rail X moves with respect to the fixed stress-relief heat treatment apparatus 30. In the latter case, for example, in shop welding, the stress-relief heat treatment apparatus 30 is arranged at the downstream side of the rail welding apparatus, the rail X continuously moves, and thus, each of the induction heating coils 31a to 31d can be arranged at a predetermined position.

After the induction heating coils 31a to 31d are arranged, alternating currents flow into the induction heating coils 31a to 31d, and thus, as described above, it is possible to heat the whole circumference of the rail in the predetermined position separated by the predetermined distance from the welding center X2 by the induction heating. As described above, preferably, alternating currents flow in directions opposite to each other with respect to the induction heating coils 11a and 11b and the induction heating coils 11c and 11d which are arranged on both sides while interposing the welding center X2 therebetween. Accordingly, the density of the alternating flux in the vicinity of the welding center X2 is decreased and the increase in the temperature of the welding center X2 is prevented, and thus, it is possible to more effectively decrease the residual stress in the vertical direction.

The frequency of the alternating current is not particularly limited. However, for example, the frequency may be 1 kHz to 50 kHz, and preferably, the frequency is 1 kHz to 20 kHz, and more preferably, 1 kHz to 18 kHz. It is considered that the value ranges are relatively lower values in the technical field of the induction heating using the induction heating coil. In this way, the frequency of the alternating current is relatively low, and thus, a skin effect is generated, even the relatively inner portion of the rail X can be heated, and it is possible to more effectively decrease the residual stress. When the frequency is less than 1 kHz, the heating velocity may be increased, and when the frequency exceeds 20 kHz, only the surface of the rail X may be heated.

Preferably, the heating velocity by the induction heating coil 31a to 31d is 2.0° C./s or more, more preferably, is 2.5° C./s or more, and most preferably, is 2.8° C./s or more. In this way, the heating is performed at a high heating velocity, and thus, the increase in the temperature of the weld zone is prevented, and it is possible to sufficiently decrease the residual stress. In addition, according to the stress-relief heat treatment apparatus 30, in this way, since the heating is performed using the induction heating coils 31a to 31d, it is possible to increase the heating velocity. Considering capacity of the induction heating coils 31a to 31d, for example, the upper limit of the heating velocity is approximately 5.0° C./s.

For example, the heating by the induction heating coils 31a to 31d can be performed to a heating temperature of 400° C. or higher and 750° C. or lower. Here, the "heating temperature" according to the present invention is the maximum temperature in the heated portion. When the heating temperature is less than 400° C., there is a concern that effects for decreasing the residual stress may be decreased. On the other hand, when the heating temperature exceeds 750° C., there is a concern that the heated portion may be excessively softened, which is not preferable. In this way, after the rail is heated from room temperature to the heating temperature, the heating stops, and the rail may be cooled by natural cooling. If the stress-relief heat treatment apparatus 10 is used, it is possible to sufficiently decrease the residual stress by only the heating control without performing a specific cooling control.

As described above, according to the stress-relief heat treatment apparatus 30, it is possible to heat the region which is separated from the welding center X2 of the rail X in the longitudinal direction of the rail X by the predetermined distances C3 and C4 at a fast heating velocity by the induction heating coils 31a to 31d. Accordingly, it is possible to effectively decrease the residual stress in the vertical direction existing on the weld zone X1 of the welded rail X. In addition, when a burner is used as the heating unit, the heating velocity is low, and it is difficult to heat only a desired region. Since a flame of the burner heats a wide range, when the burner is used as the heating unit, the flame abuts not only the region separated from the welding center X2 by the predetermined distance but also the welding center X2, and thus, the increase in the temperature of the welding center X2 is large. On the other hand, since controllability of the heating region is improved in the induction heating coils 31a to 31d, according to the stress-relief heat treatment apparatus 30 having the induction heating coils 31a to 31d, a desired region (the region separated from the welding center X2 by the predetermined distance) is heated, it is possible to suppress the increase in the temperature of the welding center X2, and it is possible to effectively decrease the residual stress. Moreover, since the induction heating coils 31a to 31d of the stress-relief heat treatment apparatus 30 heat the whole circumference of the rail X, it is possible to decrease the residual stress in the vertical direction, and it is also possible to suppress the increase of the residual stress in the longitudinal direction of the rail X.

In addition, in the stress-relief heat treatment apparatus 30, since each of the induction heating coils 31a to 31d is distributed on both sides between which the welding center X2 is interposed, it is possible to simultaneously heat both sides of the welding center X2. Accordingly, since the heating velocity is fast and the offset of the residual stress is uniformly performed, it is possible to further decrease the residual stress, and it is possible to shorten the time of the stress-relief heat treatment. In addition, since the induction heating coils 31a to 31d are arranged so that the number of arrangement locations of the induction heating coils 31a to 31d is two in the one side of the welding center X2 (the number of arrangement locations may be more than two, and for example, the upper limit of the number of the arrangement locations on the one side is five), it is possible further increase the heating velocity, and it is possible to more effectively decrease the residual stress.

Fourth Embodiment

Figure 5A:
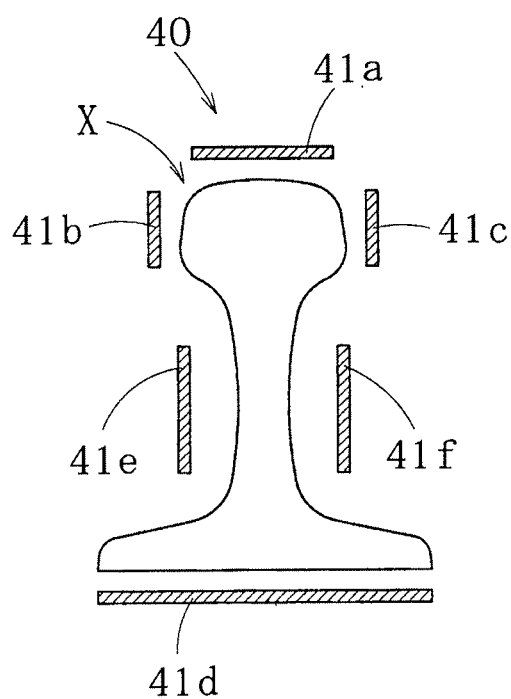
FIG. 5A is a schematic cross-sectional view showing a stress-relief heat treatment apparatus according to a fourth embodiment of the present invention.
Figure 5B:
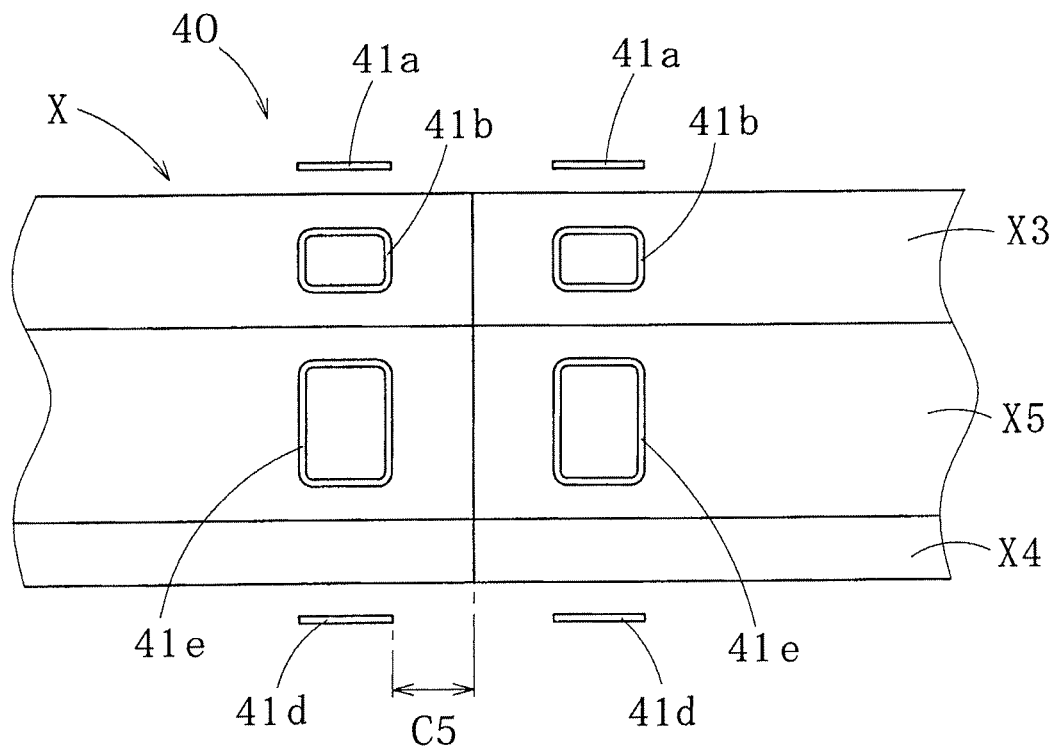
FIG. 5B is a schematic side view showing the stress-relief heat treatment apparatus according to the fourth embodiment of the present invention.

As shown in FIGS. 5A and 5B, a stress-relief heat treatment apparatus 40 according to a fourth embodiment of the present invention is a stress-relief heat treatment apparatus of the welded rail X, and includes twelve induction heating coils 41a to 41f and a high-frequency power source (not shown). The stress-relief heat treatment apparatus 40 is similar to the stress-relief heat treatment apparatus 10 shown in FIGS. 1A and 1B except for the number and the shapes of the induction heating coils 41a to 41f, and the arrangement locations.

In the stress-relief heat treatment apparatus 40 according to the fourth embodiment of the present embodiment, a plurality of induction heating coils are arranged to cover the whole circumference of the rail in a state where the plurality of induction heating coils in which distances from the welding center X2 along the longitudinal direction of the rail are the same as one another are separated from one another. Hereinafter, the configuration will be specifically described. The twelve induction heating coils 41a to 41f are distributed six by six and interpose the welding center X2 of the rail X along the longitudinal direction of the rail with being symmetrical. Specifically, in each of both sides in the longitudinal direction of the rail between which the welding center X2 is interposed, the induction heating coil 41a is arranged on the top surface of the head X3 of the rail X, the induction heating coils 41b and 41c is arranged on both lateral faces of the head X3, respectively, the induction heating coil 41d is arranged on the bottom face of the base X4, and the induction heating coils 41e and 41f are arranged on both lateral faces of the web X5, respectively. Each of all induction heating coils 41*a* to 41*f* is slightly separated from the rail X (that is, is in a non-contact state with the rail). In addition, a gap is also provided between the induction heating coils 41*a* to 41*f*. Moreover, the induction heating coils 41*a* to 41*f* are arranged so that a distance C5 between each of the induction heating coils 41*a* to 41*f* and the welding center X2 is within 20 mm to 300 mm. In addition, in the stress-relief heat treatment apparatus 40, the number of arrangement locations of the induction heating coils on one side of the welding center X2 is one (all induction heating coils are positioned at the distance C5). However, the number of arrangement locations of the induction heating coils may be two or more.

Each of the induction heating coils 41*a* to 41*f* is arranged so that the axial direction thereof is vertical with respect to the surfaces of the head X3, the base X4, and the web X5 of the rail X. When the induction heating coils 41*a* to 41*f* are arranged in this way, if alternating currents flow into each of the induction heating coils 41*a* to 41*f*, the head X3 can be heated from the upper side by the induction heating coil 41*a*, the head X3 can be heated from both lateral sides by the induction heating coils 41*b* and 41*c*, the base X4 can be heated from the lower side by the induction heating coil 41*d*, and the web X5 can be heated from both lateral sides by the induction heating coils 41*e* and 41*f*.

The plurality of induction heating coils 41*a* to 41*f* are arranged on the whole circumference of the rail X, and thus, the stress-relief heat treatment apparatus 40 heats the whole circumference of the rail X. Accordingly, similar to the stress-relief heat treatment apparatus 30 according to the third embodiment, it is possible to decrease the residual stress in the vertical direction, and it is also possible to suppress the increase of the residual stress in the longitudinal direction of the rail X. In addition, each of the induction heating coils 41*a* to 41*f* does not directly cover the lower surface of the head X3 and the upper surface side of the base X4. However, the lower surface and the upper surface are substantially heated. In this way, each portion is heated by each of the plurality of induction heating coils 41*a* to 41*f*, and thus, it is possible to control the temperature for each portion. Moreover, in the stress-relief heat treatment apparatus 40, six induction heating coils are arranged with respect to one arrangement location. However, the number of the induction heating coils with respect to the one arrangement location is not limited as long as the rail X is heated over the whole circumference. The number of the induction heating coils may be changed according to the sizes of the rail X and the induction heating coils 41*a* to 41*f*. Moreover, similar to other embodiments, other configurations can be changed.

Other Embodiments

The present invention is not limited to the above-described embodiments, and the configuration thereof can be changed within a range in which the gist of the present invention is not changed. For example, the induction heating coil may be arranged on only one side of the welding center X2 of the rail X. In addition, when the axial direction of the induction heating coil is vertical to the surface of the rail X, the induction heating coil may be arranged on only the one surface side of the web X5 of the rail X. Moreover, when the induction heating coil is arranged on one side of the welding center X2 of the rail X, only the side of the welding center X2 may be heated, and both sides of the welding center X2 may be sequentially heated. The number of the arrangement locations of the induction heating coil is not particularly limited, and may be one or plural. When the number of the arrangement locations is plural, the induction heating coils may be asymmetrically arranged to the welding center X2. In addition, induction heating coils which can be arranged to heat the head X3 and the base X4 along with the web X5 may be provided. Moreover, like the stress-relief heat treatment apparatus 30 shown in FIGS. 4A and 4B, when the axial direction of the induction heating coil is parallel to the longitudinal direction of the rail X and the induction heating coil covers the whole circumference of the rail X, the shape of the induction heating coil viewed in the axial direction may be an enlarged shape approximately similar to the cross-sectional outer edge of the rail X. However, in addition to that, for example, the shape of the induction heating coil may be an elliptical shape, an approximately square shape, or an approximately rectangular shape.

EXAMPLES

Hereinafter, the contents of the present invention will be described in detail according to Examples and Comparative Examples. In addition, the present invention is not limited the following Examples. In addition, measurements were performed according to the following method.

<Residual Stress>

A measurement method of the residual stress is as follows. First, a strain gauge having a gauge length of 2 mm was bonded to the surface of the measurement position, and the strain was measured by wiring the strain gauge to a measuring instrument. At this time, for the following cutting process, waterproof coating of the strain gauge was performed. Thereafter, the measurement portion to which the strain gauge was bonded was cut into a shape having a plate thickness of 5 mm, a length of 15 mm, and a width of 15 mm while sufficiently distributing water to the cut location so that the quality of the strain gauge was not changed by the heat generated by the cutting. After the measurement portion was cut, the strain gauge was connected to the measuring instrument again, and the residual stress was calculated from variation of the strain (a difference between the strain before the measurement portion was cut and the strain after the measurement portion was cut).

Example 1

A stress-relief heat treatment apparatus A was configured, in which a pair of induction heating coils, which had an approximately rectangular shape having a short side of 50 mm and a long side of 70 mm and in which the number of turns was one, was connected to a high-frequency power source, and spot heating was performed on both lateral faces of the web of the rail. In addition, a stress-relief heat treatment apparatus B was configured, which had the enlarged shape approximately similar to the cross-section of the rail vertical in the longitudinal direction of the rail, one induction heating coil in which the number of turns was two was connected to a high-frequency power source, and the whole circumference was heated. The induction heating coil of the stress-relief heat treatment apparatus B was formed of a copper pipe in which the cross-section was an approximately rectangular shape (20 mm×10 mm). In the stress-relief heat treatment apparatuses A and B, means for moving and fixing the induction heating coil to a predetermined position was provided. In addition, as Comparative Example, a stress-relief heat treatment apparatus C was configured, in which the rail was heated by gas heating.

By the induction heating (post heating) using the stress-relief heat treatment apparatuses A and B and the gas heating (post heating) using the stress-relief heat treatment apparatus C, the stress-relief heat treatment was performed on a long rail having the HAZ width of 15 mm welded by flash-butt welding, and a long rail having the HAZ width of 100 mm welded by thermit welding according to the following conditions. The heating was performed on only one side with respect to the welding center. As the rail material configuring the rail, a rail formed from hyper-eutectoid carbon steel was used (this rail material was similarly applied to the following other Examples). Moreover, natural cooling was performed after the heating.

Specific test conditions are as follows. Moreover, among the following test conditions, conditions which are not particularly specified are applied to all the stress-relief heat treatment apparatuses A to C.

HAZ Width of Weld Zone: two kinds of 15 mm and 100 mm

Residual Stress of as-welded rails: 250 MPa (Rail of 100 mm in HAZ width) and 500 MPa (Rail of 15 mm in HAZ width)

Coil Shape and Coil Arrangement Method for Stress-relief Heat Treatment Apparatus A: a pair of induction heating coils was arranged to oppose to each other while interposing the web in a state where the long side (70 mm) of the induction heating coil corresponded to the rail height direction, the short side (50 mm) of the induction heating coil corresponded to the rail longitudinal direction, and the center portion in the vertical direction of the web overlapped with the intermediate position of the long side of the induction heating coil.

Coil Shape and Coil Arrangement Method for Stress-relief Heat Treatment Apparatus B: coils, in which the substantial heating width in the longitudinal direction was 50 mm (this heating width was obtained by winding a copper pipe having the cross-sectional long side of 20 mm twice) and the shape viewed in the axial direction was an enlarged shape approximately similar to the cross-sectional outer edge of the rail, were arranged to cover the rail in a state where the axial direction of the coil and the longitudinal direction of the rail were parallel with each other.

Distance from Welding Center to Heating Position: the distance was changed between 10 mm and 400 mm (10 mm, 20 mm, 50 mm, 100 mm, 200 mm, 300 mm, and 400 mm)

Heating Temperature: heating from room temperature to 700° C.

Heating Velocity in Case of Stress-relief Heat Treatment Apparatuses A and B: two kinds of 2.5° C./s and 3.0° C./s Heating Velocity in Case of Stress-relief Heat Treatment Apparatus C: 2.5° C./s Number of Heating Locations: one on one side of the welding center Induction Heating Apparatus Output for Stress-relief Heat Treatment Apparatuses A and B (per one pair in the case of spot heating and per one coil in the case of the whole circumference heating): 100 kW in a case of the heating velocity 2.5° C./s and more than 100 kW in a case of the heating velocity 3.0° C./s Frequency of Induction Heating Apparatus for Stress-relief Heat Treatment Apparatuses A and B: 30 kHz Fuel Gas for Gas Heating in Case of Stress-relief Heat Treatment Apparatus C: propane-air mixed gas The residual stress in the height direction of the web in the weld zone was measured after the stress-relief heat treatment was performed. A ratio of the residual stress in the height direction of the web in the weld zone after the stress-relief heat treatment with respect to the residual stress in the height direction of the web in the weld zone in as-welded state (i.e, in which the stress-relief heat treatment is not performed) is shown in FIG. 6.

Figure 6:
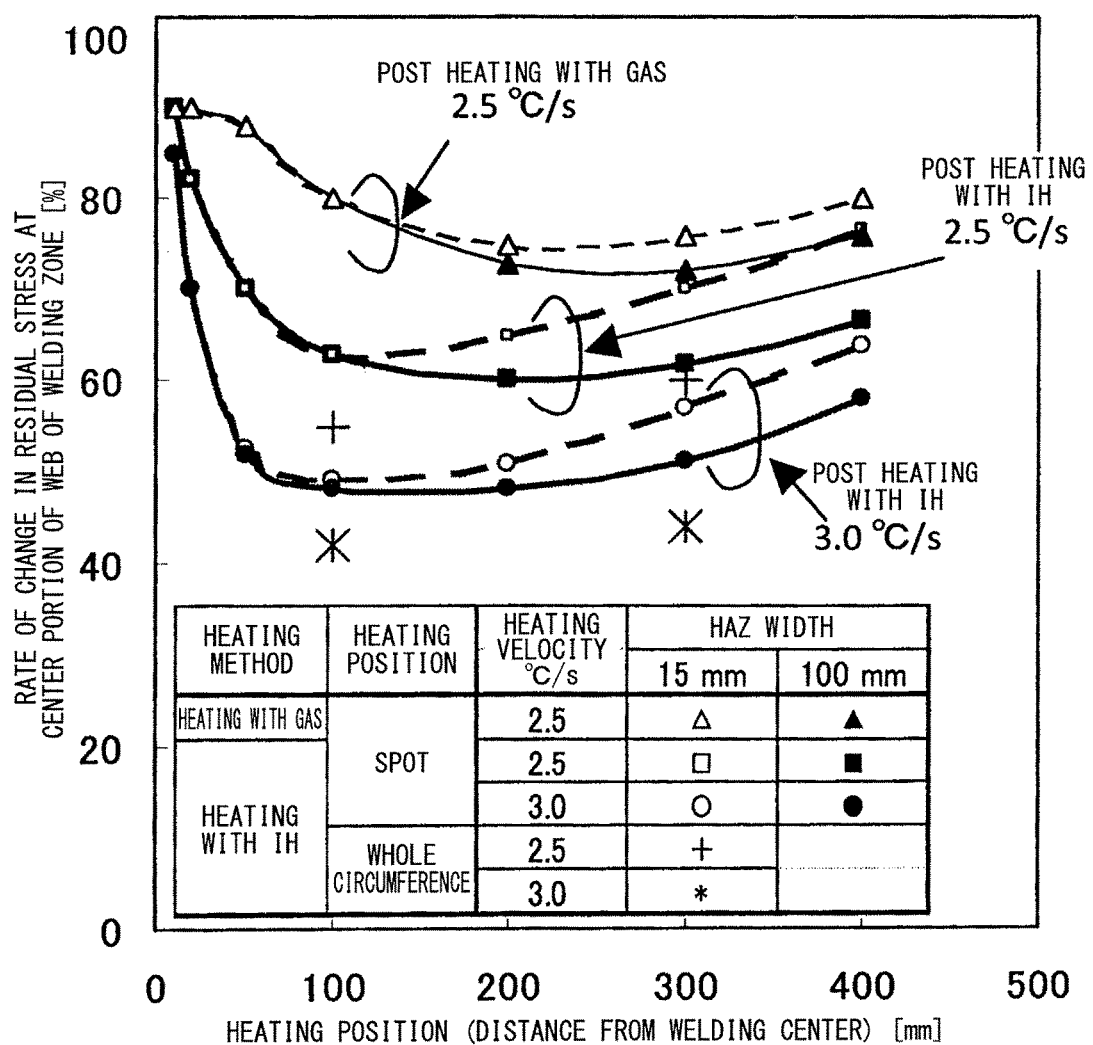
FIG. 6 is a graph showing a measurement result of the residual stress of each rail according to Example 1.

As shown in FIG. 6, when the distance from the welding center to the heating position is 10 mm, effects of decreasing the residual stress of the stress-relief heat treatment apparatuses A to C are similar to one another. However, when the distance from the welding center to the heating position is 20 mm or more, effects of decreasing the residual stress of the stress-relief heat treatment apparatuses A and B are higher than the effects of decreasing the residual stress of the stress-relief heat treatment apparatus C. The residual stress in the weld zone is decreased as the distance from the welding center to the heating position is increased. However, when the distance is increased to some extent, the effects of decreasing the residual stress are likely to be steeply decreased. In addition, in the stress-relief heat treatment apparatus C using the gas heating, the flame is also applied to the weld zone, the temperature difference is not easily obtained, and as a result, the residual stress is not easily decreased.

Moreover, when the heating velocity is slow, the temperature of the heated portion is transmitted to the weld zone, and similar to the heated portion, the expansion strain and the constriction strain also easily occur in the weld zone, and thus, the compression stress applied to the weld zone during the cooling is decreased. As a result, the effect of decreasing the residual stress is decreased. In an induction heating apparatus (IH), it is possible to make the heating velocity be 3.0° C./s or more by increasing the output. If the heating velocity is increased, a heat transfer quantity to the weld zone is decreased, the temperature difference between the heating portion and the weld zone is increased, and thus, it is possible to effectively decrease the residual stress of the weld zone. On the other hand, the heating velocity of the stress-relief heat treatment apparatus C performing the gas heating was approximately 2.5° C./s at most even in the case of a mixed gas using oxygen as the combustion gas.

In addition, compared to the spot heating, the whole circumference heating can heat the web at a wider scope along the height direction of the web, and as a result, stronger compressive stress can be applied to the weld zone during the cooling. Accordingly, the stress-relief heat treatment apparatus B performing the whole circumference heating could further decrease the residual stress.

In this way, when the gas heating was performed, the residual stress of approximately 75% remained in the welding center even in the best result. On the other hand, when the IH heating (high-frequency heating) was performed, the residual stress of the welding center could be decreased to approximately 40%. Meanwhile, when the heat treatment with respect to the rail was performed by the stress-relief heat treatment method described in Patent Document 2 in which the cooling control of the weld zone was performed (the weld zone was cooled to 570° C. in an accelerated cooling manner by compressed air after the weld zone was heated to 900° C., and thereafter, the weld zone was cooled by water), a decreasing ratio of the residual stress in the welding center was approximately 75%.

Example 2

As shown in FIG. 8, in the stress-relief heat treatment apparatuses A and B, the induction heating coil was arranged on one side or both sides with respect to the welding center, and the number of arrangement locations per one side of the induction heating coil was set to one, two, or three. Using each stress-relief heat treatment apparatus, the stress-relief heat treatment heating only one side with respect to the welding center and the stress-relief treatment heating both sides with respect to the welding center were performed on the long rail welded by flash-butt welding. In addition, when both sides were heated, in the stress-relief heat treatment apparatus A, the stress-relief heat treatment which sequentially heated the one side and the stress-relief heat treatment which simultaneously heated both sides were performed, and in the stress-relief heat treatment apparatus B, the stress-relief heat treatment in which the current directions of two induction heating coils between which the welding center was interposed were forward directions and the stress-relief heat treatment in which the current directions were backward directions were performed. The conditions are as follows. In addition, natural cooling was performed after the heating. Moreover, among the following test conditions, the conditions which are not particularly specified are applied to the stress-relief heat treatment apparatuses A and B.

HAZ Width of Weld Zone: 15 mm
Residual Stress of as-welded rails: 500 MPa
Coil Shape and Coil Arrangement Method for Stress-relief Heat Treatment Apparatus A: a pair of induction heating coils was arranged to oppose to each other while interposing the web in a state where the long side (70 mm) of the induction heating coil corresponded to the rail height direction, the short side (50 mm) of the induction heating coil corresponded to the rail longitudinal direction, and the center portion in the vertical direction of the web overlapped with the intermediate position of the long side of the induction heating coil.
Coil Shape and Coil Arrangement Method for Stress-relief Heat Treatment Apparatus B: coils, in which the substantial heating width in the longitudinal direction was 50 mm and the shape viewed in the axial direction was an enlarged shape approximately similar to the cross-sectional outer edge of the rail, were arranged to cover the rail in a state where the axial direction of the coil and the longitudinal direction of the rail were parallel with each other.
Distance from Welding Center to Heating Position: 50 mm
Heating Temperature: heating from room temperature to 700° C.
Heating Velocity: (this was changed according to the heating method)
Number of Arrangement Locations of Coil: one location to three locations on one side of the welding center, and one location to three locations on each of both sides of the heating center.
Induction Heating Apparatus Output (per one pair in the case of spot heating and per one coil in the case of the whole circumference heating): 100 kW in a case of the heating velocity 2.5° C./s and more than 100 kW in a case of the heating velocity 3.0° C./s
Frequency of Induction Heating Apparatus: 30 kHz The residual stress in the height direction of the web in the weld zone after the stress-relief heat treatment was measured. A ratio of the residual stress in the height direction of the web in the weld zone after the stress-relief heat treatment with respect to the residual stress in the height direction of the web in the weld zone in as-welded state (i.e, in which the stress-relief heat treatment is not performed) is shown in FIG. 7.

Figure 7:
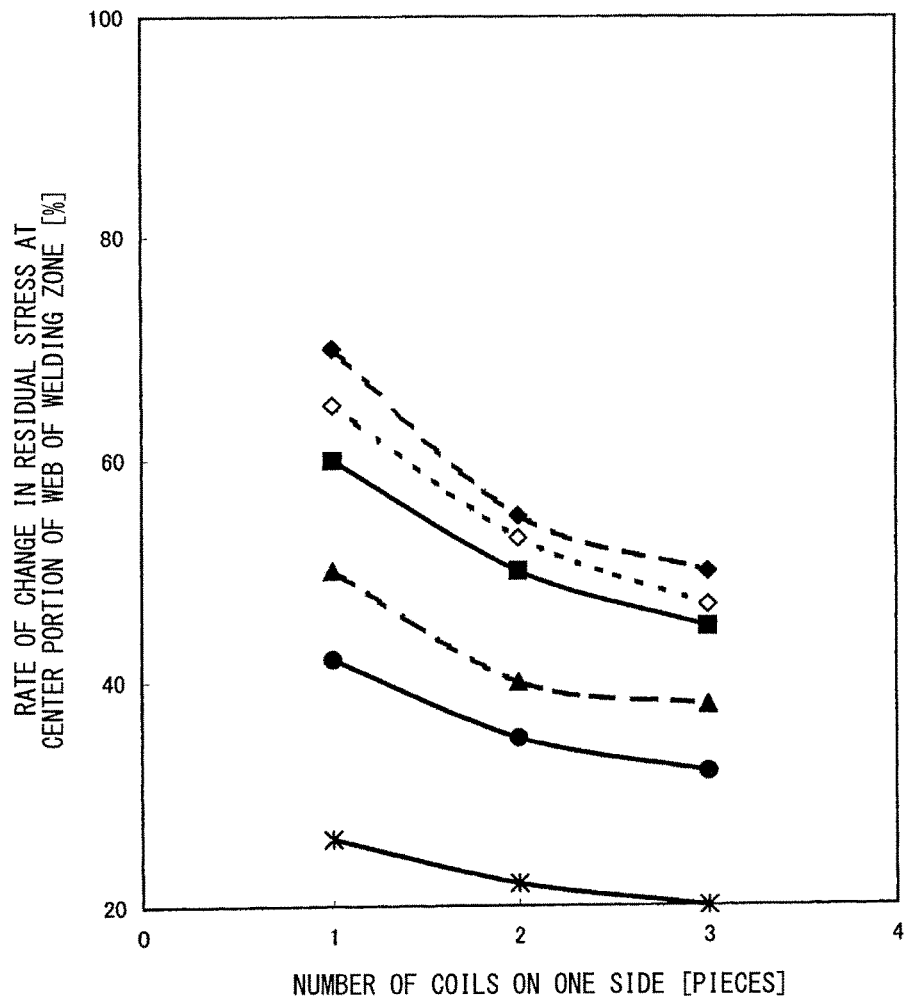
FIG. 7 is a graph showing a measurement result of the residual stress of each rail according to Example 2.

As shown in FIG. 7, the residual stress is likely to be decreased according to the increase of the coil number (the number of arrangement locations of the coils). This is because the heating velocity is increased. Moreover, compared to when only one side is heated, when both sides of the welding center are separately heated sequentially and when both sides are simultaneously heated, excellent results are exerted. However, when both sides are simultaneously heated, more excellent effects are exerted. This is because when both sides are simultaneously heated, the increase in the temperature of the weld zone is suppressed. In addition, when the stress-relief heat treatment apparatus B in which the whole circumference heating is performed is used, similar to Example 1, compared to the stress-relief heat treatment apparatus A in which the spot heating is performed, the effects of decreasing the residual stress are more excellent. In addition, in the case of the stress-relief heat treatment apparatus B, when the currents in the induction heating coils of both sides between which the welding center is interposed flow into the sides opposite to each other, it is possible to further decrease the residual stress. This is because the alternating fluxes formed by the currents flowing in the directions opposite to each other become opposite directions between which the welding center is interposed, the magnetic flux density of the welding center is decreased, and thus, the heating of the weld zone is suppressed.

Example 3

A stress-relief heat treatment apparatus D was configured in which one induction heating coil having an enlarged shape approximately similar to the cross-section shape vertical in the longitudinal direction of the rail and having two turns in the number of turns of the coils was connected to a high-frequency power source, and the whole circumference heating was performed. In addition, the induction heating coil was formed of a copper pipe in which the cross-section was an approximately rectangular shape (20 mm×10 mm). As Comparative Example, a stress-relief heat treatment apparatus E was configured in which a pair of induction heating coils having an approximately rectangular shape, which had the short side of 50 mm and the long side of 70 mm, and having one turn in the number of turns of the coil was connected to a high-frequency power source, and spot heating was performed. In addition, a stress-relief heat treatment apparatus F was configured in which the rail was heated by gas heating. In the stress-relief heat treatment apparatuses, mean for moving the induction heating coil to a predetermined position and fixing the coil was provided.

By the whole circumferential induction heating (post heating) using the stress-relief heat treatment apparatus E, the spot induction heating using the stress-relief heat treatment apparatus E, and the gas heating (post heating) using the stress-relief heat treatment apparatus F which was Comparative Example, the stress-relief heat treatment was performed on a long rail welded by flash-butt welding according to the following conditions (only one side from the welding center was heated). Moreover, the rail used a rail (hereinafter, this was similarly applied to Examples) which was formed of hyper-eutectoid carbon steel. In addition, natural cooling was performed on the rail after the heating.
HAZ Width of Weld Zone: 15 mm
Residual Stress in Longitudinal direction of as-weld rails: 200 MPa Coil Shape and Coil Arrangement Position for Spot Heating using Stress-relief Heat Treatment Apparatus F: coils were arranged to oppose each other while interposing the web in a state where the long side (70 mm) corresponded to the height direction, the short side (50 mm) corresponded to the longitudinal direction, and the center portion in the vertical direction of the web overlapped with the intermediate position of the long side.

Coil Shape and Coil Arrangement Position for Whole Circumference Heating using Stress-relief Heat Treatment Apparatus E: coils, in which the substantial heating width in the longitudinal direction was 50 mm and the shape viewed in the axial direction was an enlarged shape approximately similar to the cross-sectional outer edge of the rail, were arranged to cover the rail in a state where the axial direction of the coil and the longitudinal direction of the rail were parallel with each other.

Distance from Welding Center to Heating Position: the distance was changed between 10 mm and 400 mm.

Heating Temperature: heating from room temperature to 700° C.

Heating Velocity: 2.5° C./s

Number of Heating Locations: one on one side of the welding center

Figure 9:
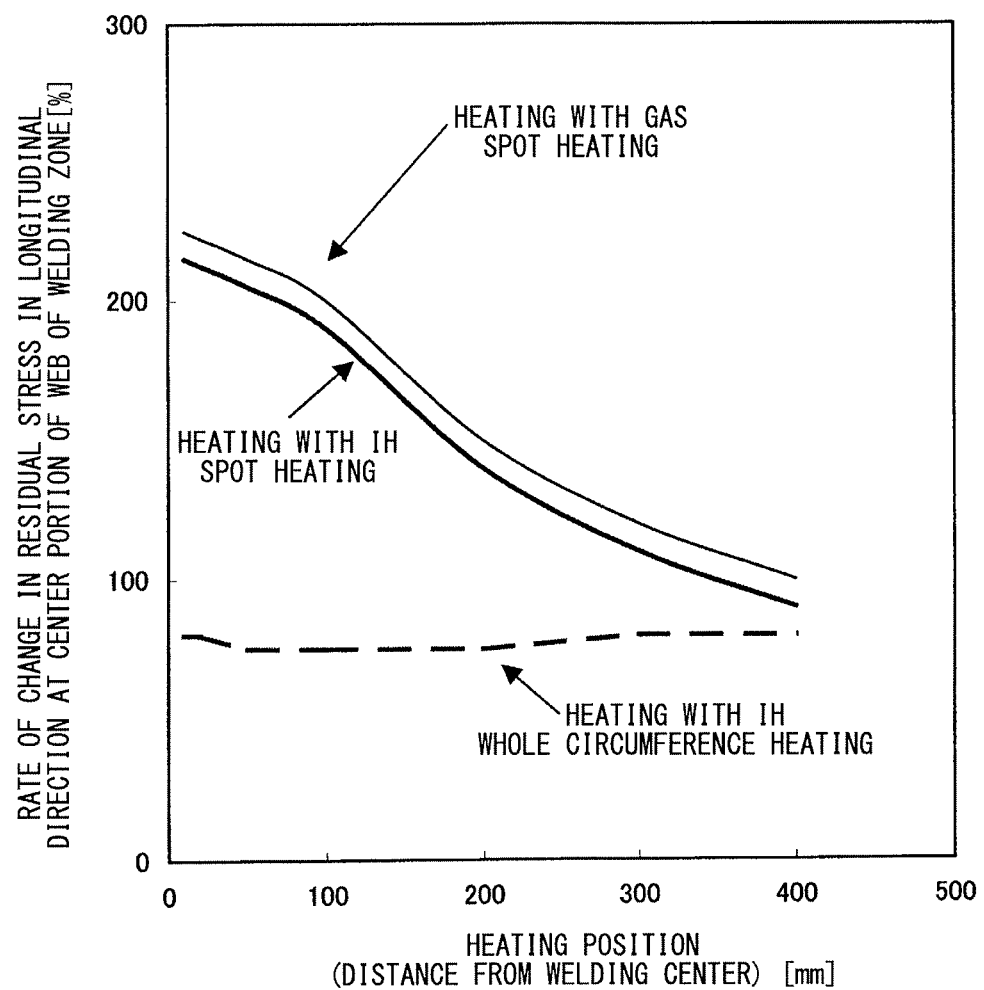
FIG. 9 is a graph showing a measurement result of the residual stress of each rail according to Example 3.

Induction Heating Apparatus Output for Stress-relief Heat Treatment Apparatuses E and F (per one pair in the case of spot heating and per one coil in the case of the whole circumference heating): 100 kW Frequency of Induction Heating Apparatus for Stress-relief Heat Treatment Apparatuses E and F: 30 kHz Gas for Gas Heating in Case of Stress-relief Heat Treatment Apparatus G: propane-air mixed gas The residual stress in the longitudinal direction of the web center in the weld zone after the stress-relief heat treatment was measured. A ratio of the residual stress after the stress-relief heat treatment with respect to the residual stress in as-welded state (i.e, in which the stress-relief heat treatment is not performed) is shown in FIG. 9. As shown in FIG. 9, unlike the case of the gas heating or the spot heating by the induction heating coil, in the case where the whole circumference heating is performed by the induction heating coil, it is understood that the residual stress in the longitudinal direction in the web center of the weld zone is decreased.

Example 4

Stress-relief heat treatment was performed according to the following conditions by using the stress-relief heat treatment apparatus E and changing the frequency. In addition, natural cooling was performed after the heating.

HAZ Width of Weld Zone: 15 mm

Residual Stress in Height direction of as-welded rails: 500 MPa

Coil Arrangement Position: coils, in which the substantial heating width in the longitudinal direction was 50 mm and the shape viewed in the axial direction was an enlarged shape approximately similar to the cross-sectional outer edge of the rail, were arranged to cover the rail in a state where the axial direction of the coil and the longitudinal direction of the rail were parallel with each other.

Distance from Welding Center to Heating Position: 50 mm

Heating Temperature: heating from room temperature to 700° C.

Heating Velocity: 2.5° C./s

Number of Arrangement Locations of Coil: one on one side of the welding center

Induction Heating Apparatus Output (per one coil): 100 kW

Frequency of Induction Heating Apparatus: the frequency was changed within a range from 0.5 kHz to 40 kHz.

The residual stress in the height direction (up-down direction) of the web in the weld zone was measured after the stress-relief heat treatment was performed. A ratio of the residual stress in the welding center after the stress-relief heat treatment with respect to the residual stress in the welding center in as-welded state (i.e, in which the stress-relief heat treatment is not performed) is shown in FIG. 10.

Figure 10:
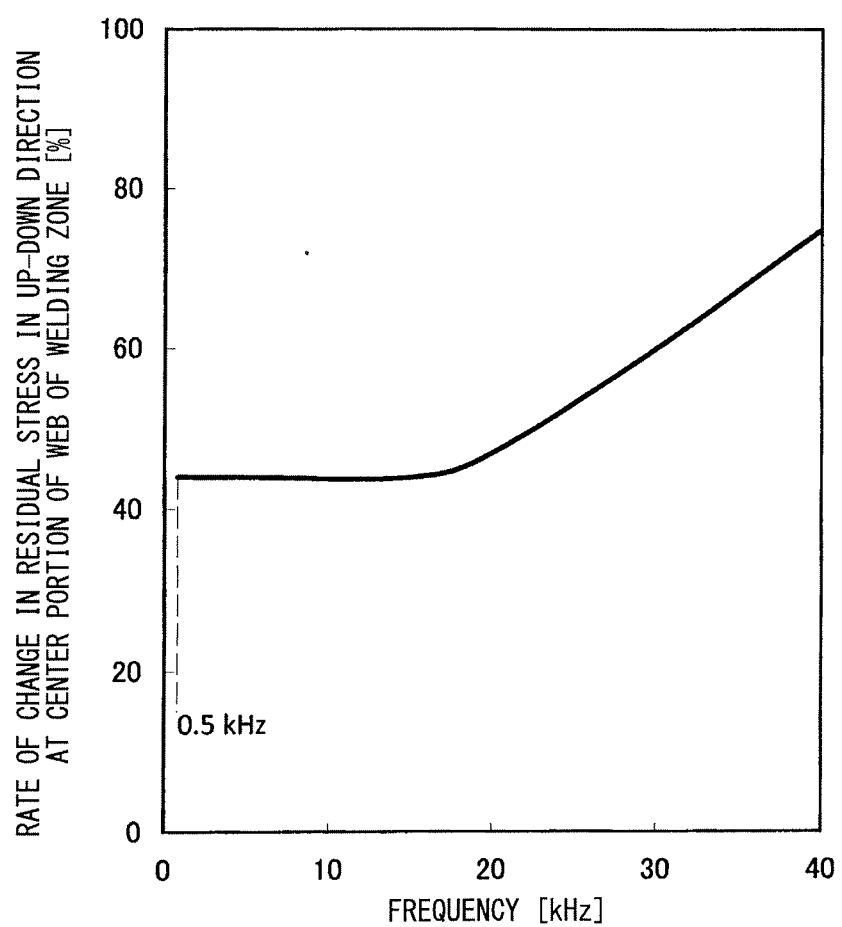
FIG. 10 is a graph showing a measurement result of the residual stress of each rail according to Example 4.
Figure 11A:
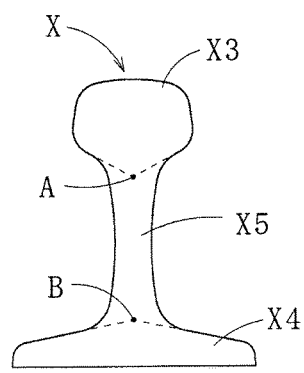
FIG. 11A is a cross-sectional view which is vertical in a longitudinal direction of a welded rail.
Figure 11B:
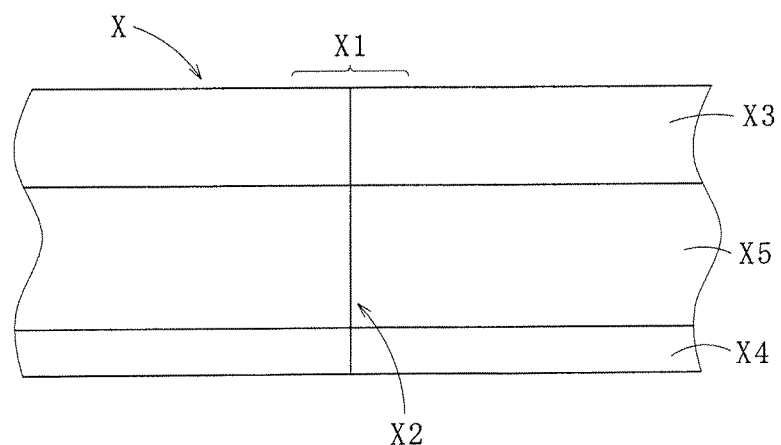
FIG. 11B is a partial side view of the welded rail.

As shown in FIG. 10, if the frequency is increased (for example, exceeds 20 kHz), uneven distribution of the induction current generated in the rail with respect to the front layer is significantly generated, and thus the temperature is not easily increased, and it is understood that the decrease of the residual stress is low.

BRIEF DESCRIPTION OF THE REFERENCE SYMBOLS 10, 20, 30, and 40: stress-relief heat treatment apparatus
11, 21, 31a to 31d, and 41a to 41d: induction heating coil
X: rail
X1: weld zone
X2: welding center
X3: head
X4: base
X5: web
X6: periphery

The invention claimed is:

1. A stress-relief heat treatment method for stress-relief heat-treating a rail which is welded, the stress-relief heat treatment method comprising:
arranging at least one pair of induction heating coils to face the rail at both sides of a welding center along a longitudinal direction of the rail while being separated from the welding center of the rail by 20 mm to 300 mm in the longitudinal direction of the rail and an axial direction of the induction heating coils being parallel to the longitudinal direction of the rail,
flowing a first current to a first induction heating coil arranged at one side of the welding center and a second current to a second induction heating coil arranged at the other side of the welding center, the first current and second current being opposite to each other so that alternating fluxes of the coils are opposite to each other, and
induction heating the rail to a heating temperature of 400° C. or higher and 750° C. or lower.

2. The stress-relief heat treatment method according to claim 1, wherein each of the induction heating coil covers an entire circumference of the rail.

3. The stress-relief heat treatment method according to claim 1, wherein a rate of heating in the induction heating is 2.0° C./s or more.

4. The stress-relief heat treatment method according to claim 1, wherein a frequency of the current flowing in the induction heating coil is 1 kHz to 20 kHz.

* * * * *